United States Patent
Sasaki et al.

(10) Patent No.: US 9,251,812 B2
(45) Date of Patent: Feb. 2, 2016

(54) MAGNETIC HEAD FOR PERPENDICULAR MAGNETIC RECORDING INCLUDING ANGLED SIDE SHIELD SURFACES

(71) Applicants: Yoshitaka Sasaki, Santa Clara, CA (US); Kazuki Sato, Milpitas, CA (US); Hiroyuki Ito, Milpitas, CA (US); Shigeki Tanemura, Milpitas, CA (US); Hironori Araki, Milpitas, CA (US); Kazumasa Yasuda, Sunnyvale, CA (US)

(72) Inventors: Yoshitaka Sasaki, Santa Clara, CA (US); Kazuki Sato, Milpitas, CA (US); Hiroyuki Ito, Milpitas, CA (US); Shigeki Tanemura, Milpitas, CA (US); Hironori Araki, Milpitas, CA (US); Kazumasa Yasuda, Sunnyvale, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/319,681

(22) Filed: Jun. 30, 2014

(65) Prior Publication Data
US 2015/0380016 A1   Dec. 31, 2015

(51) Int. Cl.
G11B 5/11 (2006.01)
G11B 5/31 (2006.01)
G11B 5/127 (2006.01)
G11B 5/17 (2006.01)

(52) U.S. Cl.
CPC ............... *G11B 5/1278* (2013.01); *G11B 5/11* (2013.01); *G11B 5/315* (2013.01); *G11B 5/3116* (2013.01); *G11B 5/3163* (2013.01); *G11B 5/17* (2013.01); *Y10T 29/49048* (2015.01)

(58) Field of Classification Search
None
See application file for complete search history.

(56) References Cited

U.S. PATENT DOCUMENTS

| 8,270,110 B2 | 9/2012 | Araki et al. | |
| 8,289,649 B2 | 10/2012 | Sasaki et al. | |
| 8,295,008 B1 * | 10/2012 | Sasaki | G11B 5/1278 360/125.02 |
| 8,767,347 B1 * | 7/2014 | Sasaki et al. | G11B 5/1278 360/123.06 |

* cited by examiner

*Primary Examiner* — Craig A. Renner
(74) *Attorney, Agent, or Firm* — Oliff PLC

(57) ABSTRACT

A first side shield has a first sidewall and a second sidewall. A second side shield has a third sidewall and a fourth sidewall. The distance between the first sidewall and the third sidewall decreases with increasing proximity to the top surface of a substrate. The second and fourth sidewalls are close to perpendicular to the top surface of the substrate. Each of the second and fourth sidewalls has an edge farthest from the top surface of the substrate, the edge being parallel to the medium facing surface. The main pole has a first, a second, a third and a fourth side surface. The first side surface is opposed to the first sidewall. A portion of the second side surface is opposed to the second sidewall. The third side surface is opposed to the third sidewall. A portion of the fourth side surface is opposed to the fourth sidewall.

8 Claims, 15 Drawing Sheets

MAGNETIC HEAD FOR PERPENDICULAR MAGNETIC RECORDING INCLUDING ANGLED SIDE SHIELD SURFACES

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has two side shields.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density when compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on the top surface of a substrate. The write head unit includes a main pole configured to produce a write magnetic field in the direction perpendicular to the plane of the recording medium. The main pole has an end face that is located in a medium facing surface configured to face the recording medium.

The main pole includes, for example, a track width defining portion having an end located in the medium facing surface, and a wide portion connected to the other end of the track width defining portion. The track width defining portion has a top surface having a width smaller than that of the top surface of the wide portion. The width of the top surface of the track width defining portion in the medium facing surface defines the track width. To achieve higher recording densities, the track width should be as small as possible. Here, the length of the track width defining portion in the direction perpendicular to the medium facing surface will be referred to as the neck height. To improve the write characteristics of the write head unit, such as the overwrite property which indicates the overwriting capability, the neck height should be as small as possible.

A magnetic head for use in a magnetic disk drive such as a hard disk drive is typically in the form of a slider. The slider has the medium facing surface. The medium facing surface has an air inflow end (a leading end) and an air outflow end (a trailing end). The slider is designed to slightly fly over the surface of the recording medium by means of an airflow that comes from the leading end into the space between the medium facing surface and the recording medium.

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

In particular, in a magnetic disk drive of the perpendicular magnetic recording system which is higher in capability of writing on a recording medium than the longitudinal magnetic recording system, the skew can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording densities, it is necessary to prevent unwanted erasure.

A known technique for preventing unwanted erasure induced by the skew is to shape the main pole such that its end face located in the medium facing surface has a width that decreases with increasing proximity to the top surface of the substrate, as disclosed in U.S. Pat. Nos. 8,270,110 B2 and 8,289,649 B2, for example.

U.S. Pat. Nos. 8,270,110 B2 and 8,289,649 B2 also disclose other effective techniques for preventing unwanted erasure induced by the skew. One of such techniques is to provide two side shields on opposite sides of the main pole in the track width direction, and another one is to provide a shield having an end face that is located in the medium facing surface and wraps around the end face of the main pole (such a shield will hereinafter be referred to as a wrap-around shield). The wrap-around shield includes a bottom shield located on the air-inflow-end side relative to the main pole, a top shield located on the air-outflow-end side relative to the main pole, and two side shields located on opposite sides of the main pole in the track width direction. These techniques allow for capturing a magnetic flux that is produced from the end face of the main pole and spreads in the track width direction. Thus, the occurrence of unwanted erasure can be prevented by these techniques.

A main pole of such a shape that its end face located in the medium facing surface has a width that decreases with increasing proximity to the top surface of the substrate suffers a problem as described below. If a main pole of such a shape is formed by a conventional method of forming a main pole, major part of the side surface of the main pole along the entire perimeter of the main pole will be formed into a slope inclined relative to a direction perpendicular to the top surface of the substrate. In such a case, the main pole has a smaller cross-sectional area perpendicular to the direction in which magnetic flux flows, when compared with a case where the entire side surface of the main pole is perpendicular to the top surface of the substrate. The main pole of the foregoing shape is unable to allow much magnetic flux to pass therethrough, especially through a portion near the boundary between the track width defining portion and the wide portion wider than the track width defining portion, and as a result, will cause degradation of write characteristics such as overwrite property.

An effective technique for solving the foregoing problem is, as disclosed in U.S. Pat. No. 8,289,649 B2, to form the main pole into the following particular shape. The main pole formed by the technique disclosed therein has six side surfaces: first and second side surfaces that are opposite to each other and located in a first region extending from the medium facing surface to a position at a predetermined distance from the medium facing surface; third and fourth side surfaces that are located in a second region other than the first region; a fifth side surface located in the boundary between the first and second regions and connecting the first side surface and the third side surface; and a sixth side surface located in the boundary between the first and second regions and connecting the second side surface and the fourth side surface. The distance between the first side surface and the second side surface in the track width direction decreases with increasing proximity to the top surface of the substrate. In the boundary between the first region and the second region, the distance between the third side surface and the fourth side surface in the track width direction when seen at the position closest to the top surface of the substrate is greater than the distance between the first side surface and the second side surface in the track width direction when seen at the position closest to the top surface of the substrate. Each of the fifth and sixth side surfaces has a width that increases with increasing proximity to the top surface of the substrate. This technique allows the main pole to have a large cross-sectional area perpendicular to the direction of flow of magnetic flux in the vicinity of the boundary between the track width defining portion and the wide portion, so that much magnetic flux can pass therethrough. This makes it possible to improve the write characteristics such as the overwrite property.

In the magnetic head disclosed in U.S. Pat. No. 8,289,649 B2, the distance between two main-pole-facing sidewalls of the two side shields gradually increases with increasing distance from the medium facing surface. In this structure, the cross-sectional area of the main pole in the vicinity of the medium facing surface is limited by the distance between the aforementioned two sidewalls of the two side shields. This structure thus has the drawback of being unable to sufficiently increase the cross-sectional area of the main pole in the vicinity of the medium facing surface.

OBJECT AND SUMMARY OF THE INVENTION

It is an object of the present invention to provide a magnetic head for perpendicular magnetic recording that includes a main pole and two side shields, the magnetic head achieving improvement in write characteristics and prevention of unwanted erasure at the same time and allowing for a sufficient increase in the cross-sectional area of the main pole in the vicinity of the medium facing surface, and to provide a manufacturing method for such a magnetic head.

A magnetic head for perpendicular magnetic recording of the present invention includes: a medium facing surface configured to face a recording medium; a coil; a main pole; a write shield formed of a magnetic material; a gap part; and a substrate having a top surface. The coil is configured to produce a magnetic field corresponding to data to be written on the recording medium. The main pole is configured to allow a magnetic flux corresponding to the magnetic field produced by the coil to pass, and configured to produce a write magnetic field for writing data on the recording medium by means of a perpendicular magnetic recording system. The gap part is formed of a nonmagnetic material and provided between the main pole and the write shield. The coil, the main pole, the write shield and the gap part are disposed above the top surface of the substrate.

The write shield includes a first side shield and a second side shield located on opposite sides of the main pole in the track width direction. The first side shield has a first end face located in the medium facing surface, and has a first sidewall and a second sidewall facing the main pole. The second side shield has a second end face located in the medium facing surface, and has a third sidewall and a fourth sidewall facing the main pole. The first sidewall is connected to the first end face. The second sidewall is located farther from the medium facing surface than is the first sidewall. The third sidewall is connected to the second end face. The fourth sidewall is located farther from the medium facing surface than is the third sidewall.

In any cross section intersecting the first and third sidewalls and parallel to the medium facing surface, the distance between the first sidewall and the third sidewall in the track width direction decreases with increasing proximity to the top surface of the substrate. The second sidewall forms a smaller angle with respect to a direction perpendicular to the top surface of the substrate than does the first sidewall. The fourth sidewall forms a smaller angle with respect to the direction perpendicular to the top surface of the substrate than does the third sidewall. Each of the second and fourth sidewalls has an edge farthest from the top surface of the substrate. The edge of each of the second and fourth sidewalls is parallel to the medium facing surface and located at a distance of 20 to 120 nm from the medium facing surface.

The main pole has an end face located in the medium facing surface, a top surface farthest from the top surface of the substrate, a bottom end opposite to the top surface, and a first, a second, a third and a fourth side surface. The end face of the main pole has a first side located at an end of the top surface of the main pole, and has a second side and a third side opposite to each other in the track width direction. The distance between the second side and the third side in the track width direction decreases with increasing proximity to the top surface of the substrate. The first side surface is connected to the second side. The second side surface is located farther from the medium facing surface than is the first side surface. The third side surface is connected to the third side. The fourth side surface is located farther from the medium facing surface than is the third side surface.

The first side surface is opposed to the first sidewall. A portion of the second side surface is opposed to the second sidewall. The third side surface is opposed to the third sidewall. A portion of the fourth side surface is opposed to the fourth sidewall. In any cross section intersecting the first and third side surfaces and parallel to the medium facing surface, the distance between the first side surface and the third side surface in the track width direction decreases with increasing proximity to the top surface of the substrate. The second side surface forms a smaller angle with respect to the direction perpendicular to the top surface of the substrate than does the first side surface. The fourth side surface forms a smaller angle with respect to the direction perpendicular to the top surface of the substrate than does the third side surface.

The gap part includes a first portion interposed between the first sidewall and the first side surface and between the second sidewall and the second side surface, and a second portion interposed between the third sidewall and the third side surface and between the fourth sidewall and the fourth side surface.

A manufacturing method for the magnetic head for perpendicular magnetic recording of the present invention includes: a step of forming a first initial side shield having the first sidewall, and a second initial side shield having the third sidewall; an etching step of etching a portion of the first initial side shield and a portion of the second initial side shield so that the first initial side shield is provided with the second sidewall and the second initial side shield is provided with the fourth sidewall; a step of forming the first and second portions of the gap part after the etching step; a step of forming an initial main pole after the step of forming the first and second portions of the gap part; a step of forming the coil; and a step of forming the medium facing surface so that the first initial side shield becomes the first side shield, the second initial side shield becomes the second side shield, and the initial main pole becomes the main pole.

In the magnetic head for perpendicular magnetic recording and the manufacturing method for the same of the present invention, the main pole may further have a first connecting surface connecting the first side surface and the second side surface, and a second connecting surface connecting the third side surface and the fourth side surface. Each of the first and second connecting surfaces has a width that increases with increasing proximity to the top surface of the substrate.

In the magnetic head for perpendicular magnetic recording and the manufacturing method for the same of the present invention, the main pole may further have a fifth side surface connected to the second side surface, and a sixth side surface connected to the fourth side surface. The fifth side surface is located farther from the medium facing surface than is the second side surface. The sixth side surface is located farther from the medium facing surface than is the fourth side surface. The fifth side surface forms a smaller angle with respect to the direction perpendicular to the top surface of the substrate than does the first side surface. The sixth side surface forms a smaller angle with respect to the direction perpendicular to the top surface of the substrate than does the third side surface. The manufacturing method for the magnetic head for perpendicular magnetic recording of the present invention may further include a step of forming a mold having a first inner wall and a second inner wall that define the shapes of the fifth side surface and the sixth side surface of the main pole, respectively, the step of forming the mold being performed between the step of forming the first and second portions of the gap part and the step of forming the initial main pole.

In the magnetic head for perpendicular magnetic recording and the manufacturing method for the same of the present invention, the write shield may further include a bottom shield and a top shield. The bottom shield has an end face that is located in the medium facing surface at a position on the rear side in the direction of travel of the recording medium relative to the end face of the main pole. The top shield has an end face that is located in the medium facing surface at a position on the front side in the direction of travel of the recording medium relative to the end face of the main pole.

In the magnetic head for perpendicular magnetic recording and the manufacturing method for the same of the present invention, the main pole has the first to fourth side surfaces defined as above, and the write shield includes the first and second side shields. These features of the present invention make it possible to prevent unwanted erasure and achieve improved write characteristics at the same time. Further, the present invention allows for sufficiently increasing the cross-sectional area of the main pole in the vicinity of the medium facing surface, and consequently allows for further improvement in write characteristics.

Other and further objects, features and advantages of the present invention will appear more fully from the following description.

DETAILED DESCRIPTION OF THE PREFERRED EMBODIMENT

Figure 6:
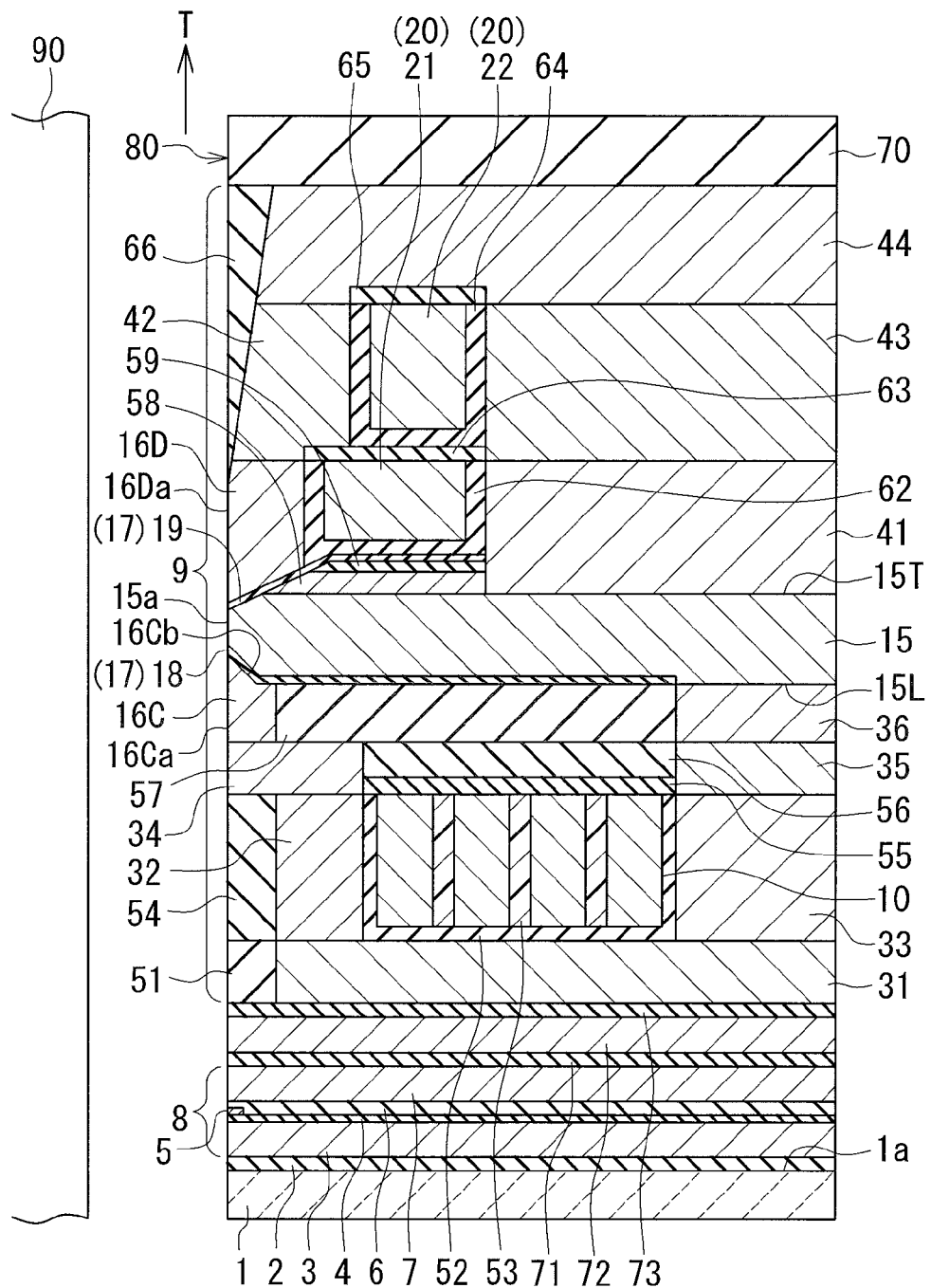
FIG. 6 is a cross-sectional view showing the configuration of the magnetic head according to the embodiment of the invention.
Figure 7:
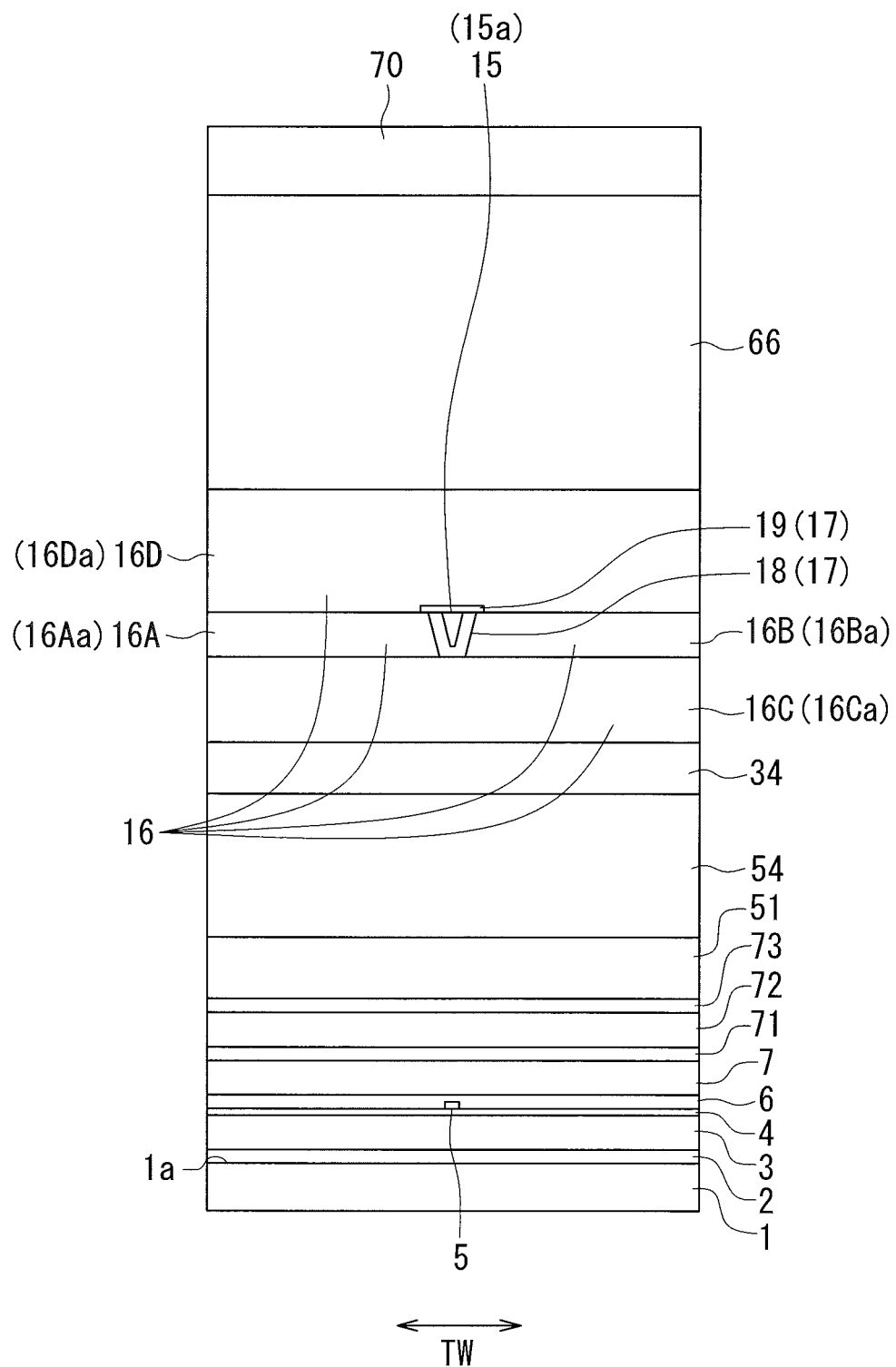
FIG. 7 is a front view showing the medium facing surface of the magnetic head according to the embodiment of the invention.
Figure 8:
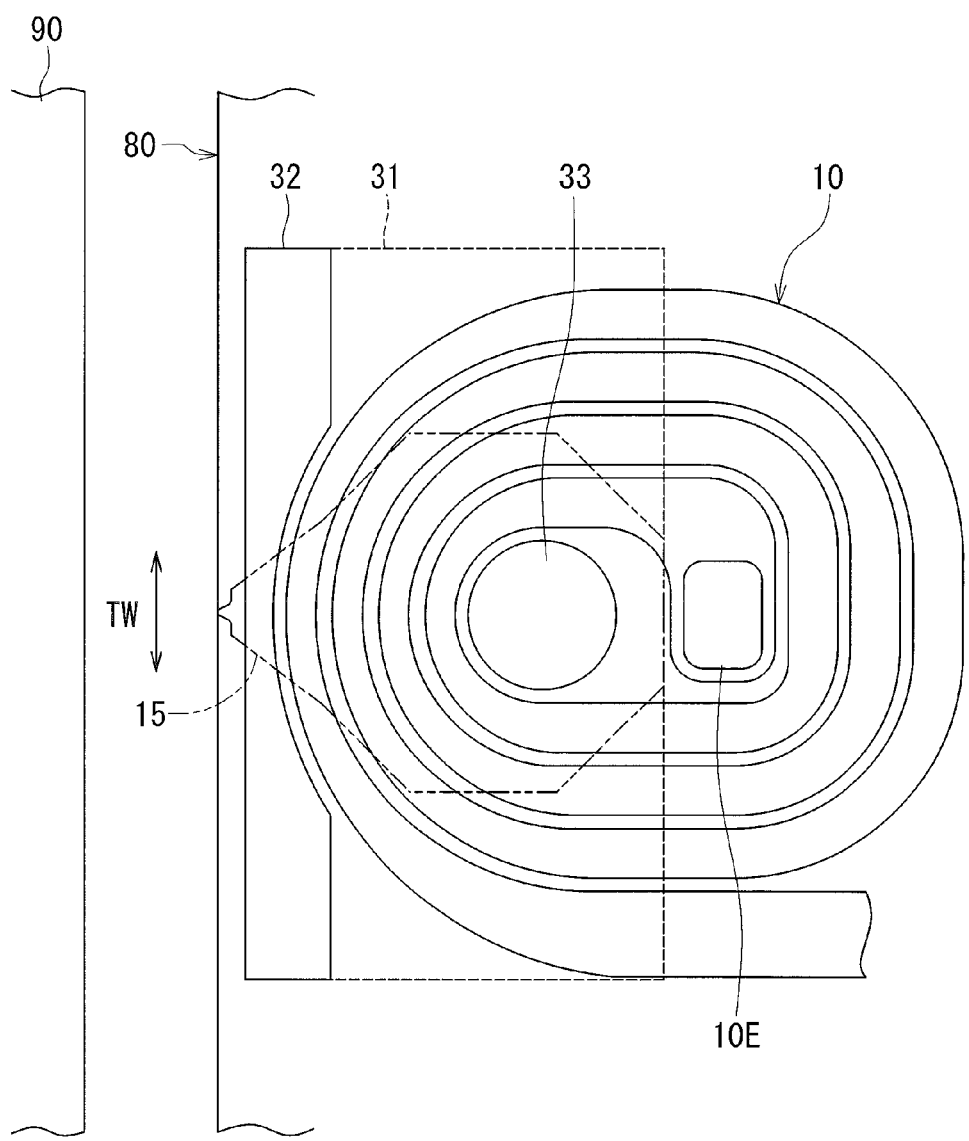
FIG. 8 is a plan view showing a first portion of a coil of the magnetic head according to the embodiment of the invention.
Figure 9:
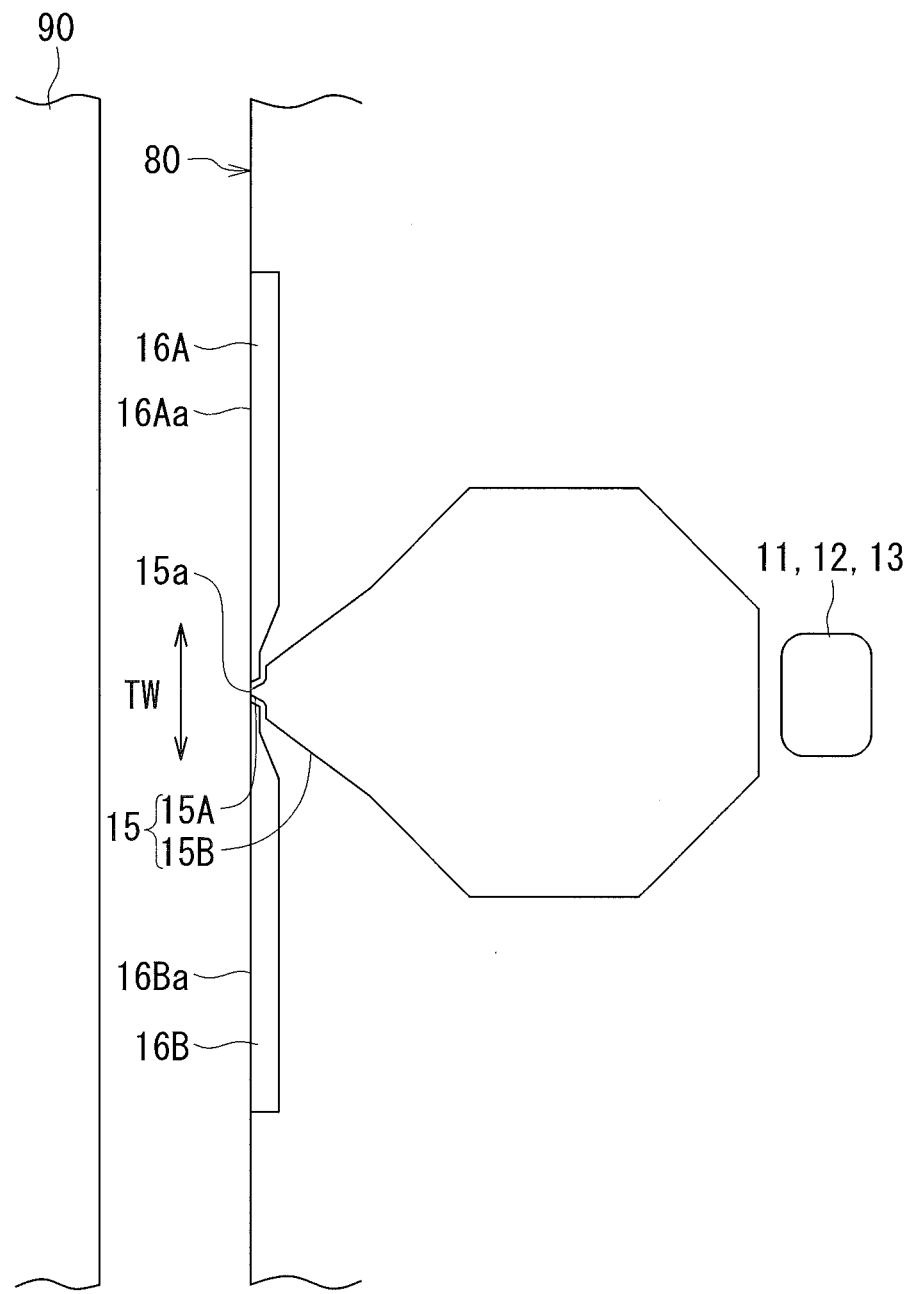
FIG. 9 is a plan view showing the main pole, the first side shield and the second side shield of the magnetic head according to the embodiment of the invention.
Figure 10:
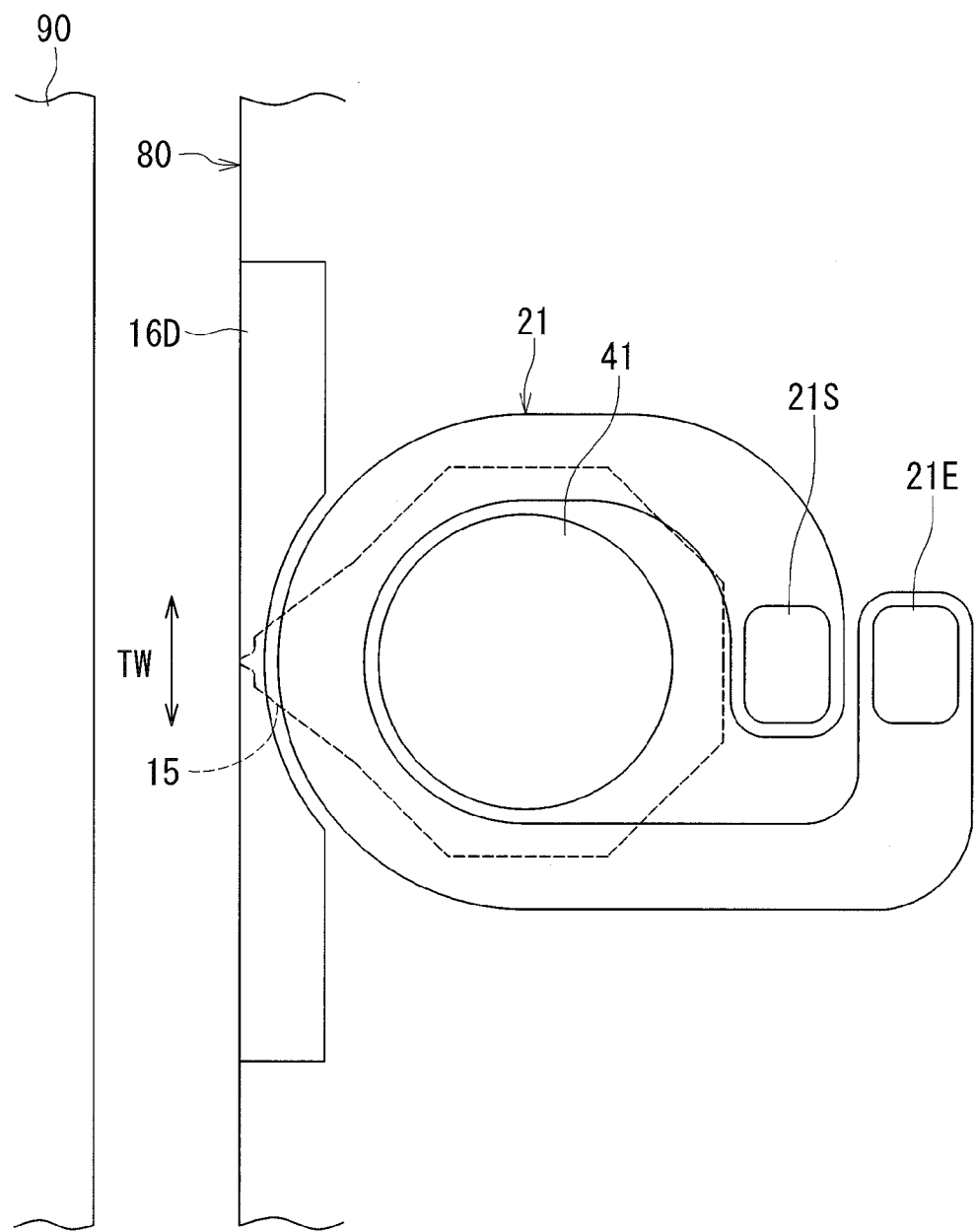
FIG. 10 is a plan view showing a first layer of a second portion of the coil of the magnetic head according to the embodiment of the invention.
Figure 11:
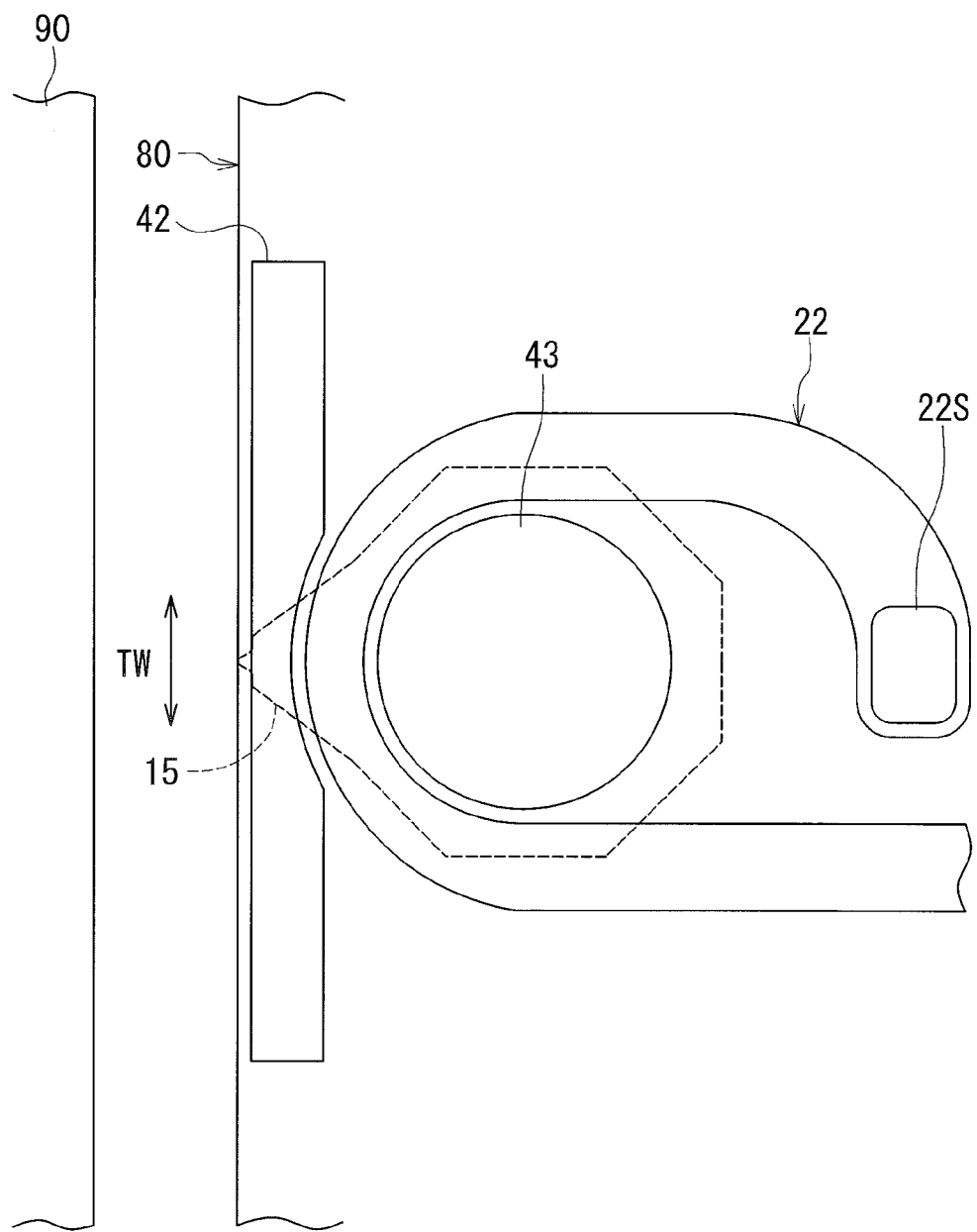
FIG. 11 is a plan view showing a second layer of the second portion of the coil of the magnetic head according to the embodiment of the invention.

A preferred embodiment of the present invention will now be described in detail with reference to the drawings. First, reference is made to FIG. 6 to FIG. 11 to describe the configuration of a magnetic head according to the embodiment of the invention. FIG. 6 is a cross-sectional view showing the configuration of the magnetic head according to the embodiment. FIG. 6 shows a cross section perpendicular to the medium facing surface and to the top surface of the substrate. The arrow with the symbol T in FIG. 6 indicates the direction of travel of a recording medium. FIG. 7 is a front view showing the medium facing surface of the magnetic head according to the embodiment. FIG. 8 is a plan view showing a first portion of a coil of the magnetic head according to the embodiment. FIG. 9 is a plan view showing a main pole, a first side shield and a second side shield of the magnetic head according to the embodiment. FIG. 10 is a plan view showing a first layer of a second portion of the coil of the magnetic head according to the embodiment. FIG. 11 is a plan view showing a second layer of the second portion of the coil of the magnetic head according to the embodiment. In each of FIG. 7 to FIG. 11, the arrow with the symbol TW indicates the track width direction.

As shown in FIG. 6, the magnetic head for perpendicular magnetic recording (hereinafter simply referred to as the magnetic head) according to the embodiment has a medium facing surface 80 configured to face a recording medium 90. Further, as shown in FIG. 6 and FIG. 7, the magnetic head includes a substrate 1 formed of a ceramic material such as aluminum oxide-titanium carbide ($Al_2O_3$—TiC) and having a top surface 1a, an insulating layer 2 formed of an insulating material such as alumina $Al_2O_3$)(and disposed on the top surface 1a of the substrate 1, a first read shield layer 3 formed of a magnetic material and disposed on the insulating layer 2, a first read shield gap film 4 which is an insulating film disposed to cover the first read shield layer 3, a magnetoresistive (MR) element 5 serving as a read element disposed on the first read shield gap film 4, a second read shield gap film 6 which is an insulating film disposed on the MR element 5, and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The parts from the first read shield layer 3 to the second read shield layer 7 constitute a read head unit 8. The magnetic head further includes a nonmagnetic layer 71 formed of a nonmagnetic material and disposed on the second read shield layer 7, a middle shield layer 72 formed of a magnetic material and disposed on the nonmagnetic layer 71, a nonmagnetic layer 73 formed of a nonmagnetic material and disposed on the middle shield layer 72, and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes a coil, a main pole 15, a write shield 16, and a gap part 17. The coil is configured to produce a magnetic field corresponding to data to be written on the recording medium 90. The coil includes a first portion 10 and a second portion 20. The first portion 10 and the second portion 20 are both formed of a conductive material such as copper. The first portion 10 and the second portion 20 are connected in series or in parallel. The main pole 15 has an end face 15a located in the medium facing surface 80. The main pole 15 is configured to allow a magnetic flux corresponding to the magnetic field produced by the coil to pass, and configured to produce a write magnetic field for writing data on the recording medium 90 by means of a perpendicular magnetic recording system. FIG. 6 shows a cross section that intersects the end face 15a of the main pole 15 and that is perpendicular to the medium facing surface 80 and to the top surface 1a of the substrate 1.

As shown in FIG. 7, the write shield 16 includes a first side shield 16A, a second side shield 16B, a bottom shield 16C, and a top shield 16D. The first and second side shields 16A and 16B are located on opposite sides of the main pole 15 in the track width direction TW. The bottom shield 16C is located on the rear side in the direction T of travel of the recording medium 90 relative to the main pole 15. The top shield 16D is located on the front side in the direction T of travel of the recording medium 90 relative to the main pole 15. The side shields 16A and 16B magnetically couple the bottom shield 16C and the top shield 16D to each other.

As shown in FIG. 7, the first side shield 16A has a first end face 16Aa located in the medium facing surface 80. The second side shield 16B has a second end face 16Ba located in the medium facing surface 80. As shown in FIG. 6 and FIG. 7, the bottom shield 16C has an end face 16Ca located in the medium facing surface 80, and a top surface 16Cb including an inclined portion. The distance from the top surface 1a of the substrate 1 to an arbitrary point on the inclined portion decreases with increasing distance from the arbitrary point to the medium facing surface 80. The top shield 16D has an end face 16Da located in the medium facing surface 80, a bottom surface, a top surface, and a connecting surface connecting the end face 16Da and the top surface. The distance from the top surface 1a of the substrate 1 to an arbitrary point on the bottom surface increases with increasing distance from the arbitrary point to the medium facing surface 80. The distance from the medium facing surface 80 to an arbitrary point on the connecting surface increases with increasing distance from the arbitrary point to the top surface 1a of the substrate 1.

The first and second end faces 16Aa and 16Ba are located on opposite sides of the end face 15a of the main pole 15 in the track width direction TW. The end face 16Ca is located on the rear side in the direction T of travel of the recording medium 90 relative to the end face 15a of the main pole 15. The end face 16Da is located on the front side in the direction T of travel of the recording medium 90 relative to the end face 15a of the main pole 15. In the medium facing surface 80, the end faces 16Aa, 16Ba, 16Ca and 16Da are arranged to wrap around the end face 15a of the main pole 15.

The write shield 16 is formed of a magnetic material. The material employed for the write shield 16 may be CoFeN, CoNiFe, NiFe, or CoFe, for example.

The write head unit 9 further includes magnetic layers 31 to 36 and 41 to 44. Each of the magnetic layers 31 to 36 and 41 to 44 is formed of a magnetic material. The material employed for each of the magnetic layers 31 to 36 and 41 to 44 may be CoFeN, CoNiFe, NiFe, or CoFe, for example. The magnetic layer 31 lies on the nonmagnetic layer 73. The magnetic layers 32 and 33 both lie on the magnetic layer 31. The magnetic layer 32 is located near the medium facing surface 80. The magnetic layer 33 is located farther from the medium facing surface 80 than is the magnetic layer 32. Each of the magnetic layers 31 and 32 has an end face that faces toward the medium facing surface 80 and that is located at a distance from the medium facing surface 80. As shown in FIG. 8, the first portion 10 of the coil is wound approximately four turns around the magnetic layer 33.

The magnetic head further includes: an insulating layer 51 formed of an insulating material, disposed on the nonmagnetic layer 73 and surrounding the magnetic layer 31; an insulating film 52 formed of an insulating material and isolating the first portion 10 from the magnetic layers 31 to 33; an insulating layer 53 formed of an insulating material and disposed in the space between adjacent turns of the first portion 10; and an insulating layer 54 formed of an insulating material and disposed around the first portion 10 and the magnetic layer 32. The top surfaces of the first portion 10, the magnetic layers 32 and 33, the insulating film 52 and the insulating layers 53 and 54 are even with each other. The insulating layers 51 and 54 and the insulating film 52 are formed of alumina, for example. The insulating layer 53 is formed of a photoresist, for example.

The magnetic layer 34 lies on the magnetic layer 32 and the insulating layer 54. The magnetic layer 35 lies on the magnetic layer 33. The magnetic layer 34 has an end face located in the medium facing surface 80. The magnetic head further includes: an insulating layer 55 formed of an insulating material and disposed over the top surfaces of the first portion 10, the insulating film 52 and the insulating layers 53 and 54; and an insulating layer 56 formed of an insulating material, disposed on the insulating layer 55 and surrounding the magnetic layers 34 and 35. The insulating layers 55 and 56 are formed of alumina, for example.

The bottom shield 16C lies on the magnetic layer 34. The magnetic layer 36 lies on the magnetic layer 35. The magnetic head further includes a nonmagnetic layer 57 formed of a nonmagnetic material. The nonmagnetic layer 57 lies on the top surface of the insulating layer 56 and part of the top surface of the magnetic layer 34, and surrounds the bottom shield 16C and the magnetic layer 36. The nonmagnetic layer 57 is formed of alumina, for example.

The first and second side shields 16A and 16B are disposed on the bottom shield 16C and in contact with the top surface 16Cb of the bottom shield 16C. The main pole 15 has a top surface 15T (see FIG. 6) farthest from the top surface 1a of the substrate 1, a bottom end 15L (see FIG. 6) opposite to the top surface 15T, and a plurality of side surfaces (see FIG. 9). Each of the first and second side shields 16A and 16B has a plurality of sidewalls. The plurality of side surfaces of the main pole 15 and the plurality of sidewalls of each of the first and second side shields 16A and 16B will be described in detail later.

As shown in FIG. 9, the main pole 15 may include: a track width defining portion 15A having an end face located in the medium facing surface 80 and an end opposite to the end face; and a wide portion 15B connected to the end of the track width defining portion 15A. In the track width defining portion 15A, the width of the top surface 15T in the track width direction TW may gradually increase with increasing distance from the medium facing surface 80 as shown in FIG. 9, or may be substantially constant regardless of distance from the medium facing surface 80. The width of the top surface 15T in the track width direction TW is greater in the wide portion 15B than in the track width defining portion 15A. The end face of the track width defining portion 15A located in the medium facing surface 80 also serves as the end face 15a of the main pole 15. The length of the ridge between the top surface 15T of the main pole 15 and the end face of the track width defining portion 15A located in the medium facing surface 80 defines the track width.

The gap part 17 is provided between the main pole 15 and the write shield 16. The magnetic head further includes a first gap layer 18 and a second gap layer 19. The first gap layer 18 is formed of a nonmagnetic material and includes a portion that forms a portion of the gap part 17. The second gap layer 19 is formed of a nonmagnetic material and includes a portion that forms another portion of the gap part 17. The aforementioned portion of the first gap layer 18 forming the portion of the gap part 17 is located between the main pole 15 and each of the side shields 16A and 16B and the bottom shield 16C. The aforementioned portion of the second gap layer 19 forming the other portion of the gap part 17 is located between the main pole 15 and the top shield 16D.

The first gap layer 18 is disposed along the plurality of sidewalls of each of the first and second side shields 16A and 16B, the top surface 16Cb of the bottom shield 16C and the top surface of the nonmagnetic layer 57. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18. The first gap layer 18 has a thickness in the range of 40 to 100 nm, for example.

The main pole 15 is disposed over the bottom shield 16C and the nonmagnetic layer 57 such that the first gap layer 18 is interposed between the main pole 15 and each of the top surface 16Cb of the bottom shield 16C and the top surface of the nonmagnetic layer 57. As shown in FIG. 7, the first gap layer 18 is interposed also between the main pole 15 and each of the first and second side shields 16A and 16B.

At a position away from the medium facing surface 80, the bottom end 15L of the main pole 15 is in contact with the top surface of the magnetic layer 36. The main pole 15 is formed of a magnetic metal material. The material employed for the main pole 15 may be NiFe, CoNiFe, or CoFe, for example.

Figure 1:
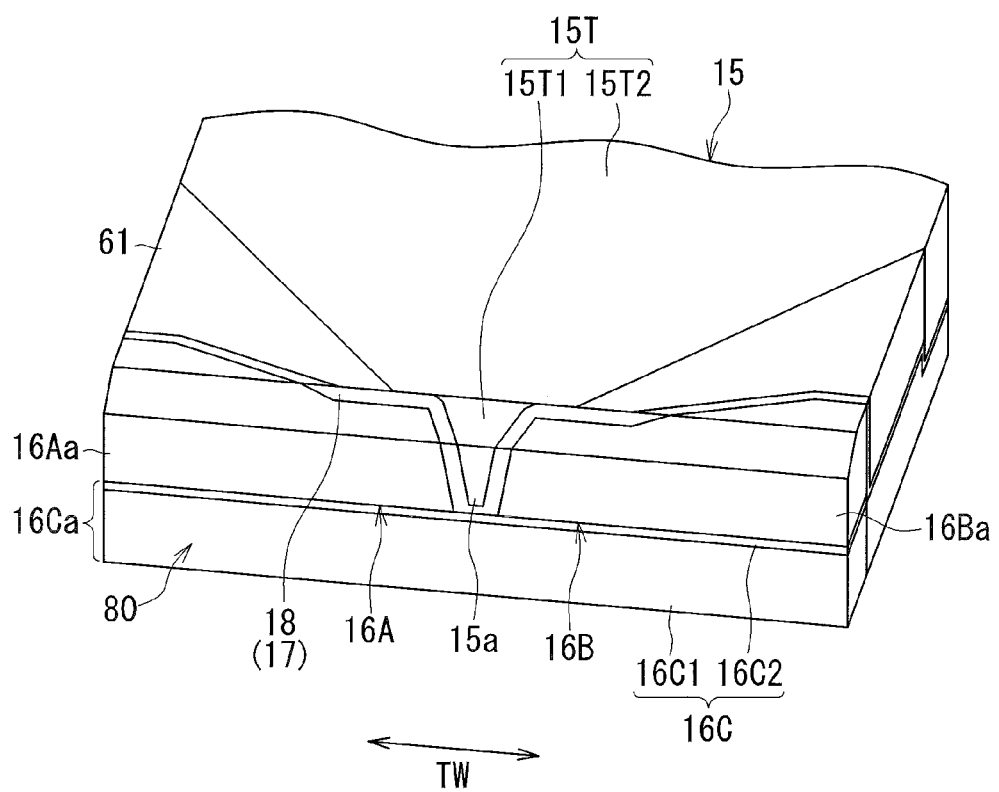
FIG. 1 is a perspective view showing part of a main pole and first and second side shields in the vicinity of a medium facing surface in a magnetic head according to an embodiment of the invention.
Figure 4:
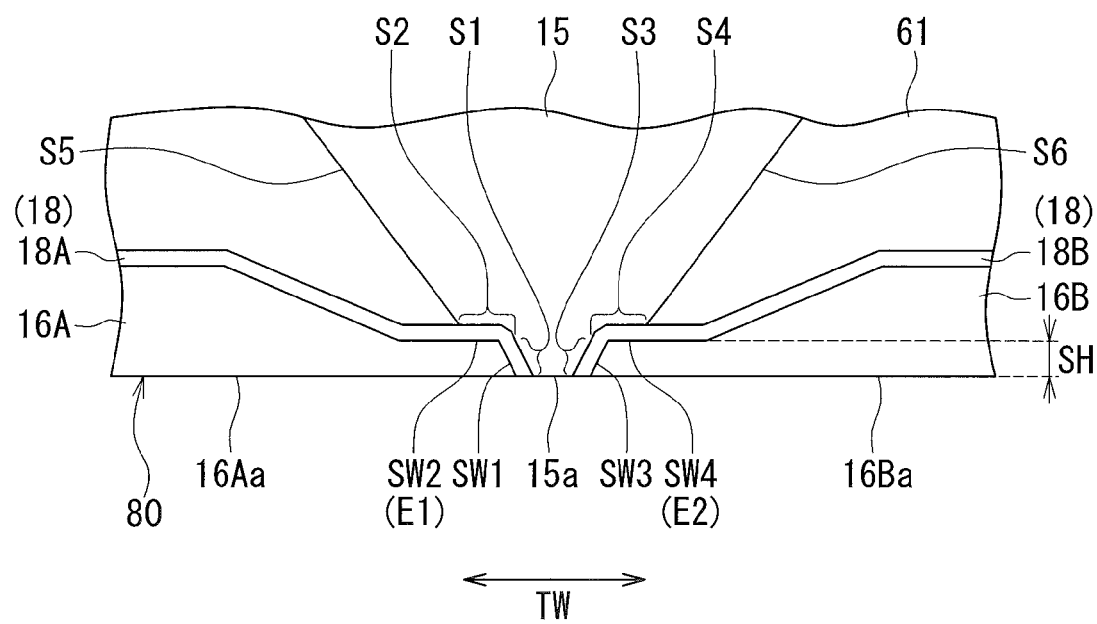
FIG. 4 is a plan view of part of the main pole and the first and second side shields in the vicinity of the medium facing surface in the magnetic head according to the embodiment of the invention.

The magnetic head further includes a nonmagnetic layer 61 formed of a nonmagnetic material and disposed around the main pole 15 and the side shields 16A and 16B. The nonmagnetic layer 61 is shown in FIG. 1 and FIG. 4, which will be described later. In the embodiment, the nonmagnetic layer 61 is formed of a nonmagnetic insulating material such as alumina, in particular.

The magnetic head further includes a nonmagnetic metal layer 58 formed of a nonmagnetic metal material, located away from the medium facing surface 80 and lying on part of the top surface 15T of the main pole 15, and an insulating layer 59 formed of an insulating material and lying on the top surface of the nonmagnetic metal layer 58. The nonmagnetic metal layer 58 is formed of Ru, NiCr, or NiCu, for example. The insulating layer 59 is formed of alumina, for example.

The second gap layer 19 is disposed to cover the main pole 15, the nonmagnetic metal layer 58 and the insulating layer 59. The material employed for the second gap layer 19 may be a nonmagnetic insulating material such as alumina or a nonmagnetic conductive material such as Ru, NiCu, Ta, W, NiB, or NiP.

The top shield 16D is disposed over the side shields 16A and 16B and the second gap layer 19, and in contact with the top surfaces of the side shields 16A and 16B and the second gap layer 19. In the medium facing surface 80, part of the end face 16Da of the top shield 16D is spaced from the end face 15a of the main pole 15 by a predetermined distance created by the thickness of the second gap layer 19. The thickness of the second gap layer 19 preferably falls within the range of 5 to 60 nm, and may be 30 to 60 nm, for example.

The magnetic layer 41 is located away from the medium facing surface 80 and lies on the main pole 15. The second portion 20 of the coil includes a first layer 21 and a second layer 22. As shown in FIG. 10, the first layer 21 is wound one turn around the magnetic layer 41. The magnetic head further includes an insulating film 62 formed of an insulating material and isolating the first layer 21 from the top shield 16D, the second gap layer 19 and the magnetic layer 41, and a first nonmagnetic layer (not illustrated) formed of a nonmagnetic material and disposed around the first layer 21 and the top shield 16D. The insulating film 62 and the first nonmagnetic layer are formed of alumina, for example. The top surfaces of the top shield 16D, the first layer 21, the magnetic layer 41, the insulating film 62 and the first nonmagnetic layer are even with each other.

The magnetic head further includes an insulating layer 63 formed of an insulating material and disposed over the top surfaces of the first layer 21 and the insulating film 62. The insulating layer 63 is formed of alumina, for example.

The magnetic layer 42 lies on the top shield 16D and the insulating layer 63. The magnetic layer 42 has an end face that faces toward the medium facing surface 80 and that is located at a distance from the medium facing surface 80. The distance from the medium facing surface 80 to an arbitrary point on the end face of the magnetic layer 42 increases with increasing distance from the arbitrary point to the top surface 1a of the substrate 1.

The magnetic layer 43 lies on the magnetic layer 41. As shown in FIG. 11, the second layer 22 is wound approximately one turn around the magnetic layer 43. The magnetic head further includes an insulating film 64 formed of an insulating material and isolating the second layer 22 from the magnetic layers 42 and 43 and the insulating layer 63, and a second nonmagnetic layer (not illustrated) formed of a nonmagnetic material and disposed around the second layer 22 and the magnetic layer 42. The insulating film 64 and the second nonmagnetic layer are formed of alumina, for example. The top surfaces of the second layer 22, the magnetic layers 42 and 43, the insulating film 64 and the second nonmagnetic layer are even with each other. The magnetic head further includes an insulating layer 65 formed of an insulating material and disposed over the top surfaces of the second layer 22 and the insulating film 64. The insulating layer 65 is formed of alumina, for example.

The magnetic layer 44 lies on the magnetic layers 42 and 43 and the insulating layer 65, and connects the magnetic layer 42 and the magnetic layer 43. The magnetic layer 44 has an end face that faces toward the medium facing surface 80 and that is located at a distance from the medium facing surface 80. The distance from the medium facing surface 80 to an arbitrary point on the end face of the magnetic layer 44 increases with increasing distance from the arbitrary point to the top surface 1a of the substrate 1.

The magnetic head further includes a nonmagnetic layer 66 formed of a nonmagnetic material and disposed around the magnetic layer 44, and a protective layer 70 formed of a nonmagnetic material and disposed to cover the write head unit 9. Part of the nonmagnetic layer 66 is interposed between the medium facing surface 80 and each of the connecting surface of the top shield 16D and the respective end faces of the magnetic layers 42 and 44 facing toward the medium facing surface 80. The nonmagnetic layer 66 and the protective layer 70 are formed of alumina, for example.

As has been described, the magnetic head according to the embodiment includes the medium facing surface 80, the read head unit 8, and the write head unit 9. The read head unit 8 and the write head unit 9 are stacked on the substrate 1. The read head unit 8 is located on the rear side in the direction T of travel of the recording medium 90, i.e., the leading side, relative to the write head unit 9.

The write head unit 9 includes the coil including the first and second portions 10 and 20, the main pole 15, the write shield 16, the gap part 17, and the magnetic layers 31 to 36 and 41 to 44. The coil, the main pole 15, the write shield 16, and the gap part 17 are disposed above the top surface 1a of the substrate 1. The write shield 16 includes the first side shield 16A, the second side shield 16B, the bottom shield 16C, and the top shield 16D. The gap part 17 is composed of part of the first gap layer 18 and part of the second gap layer 19.

The magnetic layers 31 to 36 are located on the rear side in the direction T of travel of the recording medium 90 relative to the main pole 15, and constitute a first return path section. As shown in FIG. 6, the first return path section (the magnetic layers 31 to 36) connects the write shield 16 and part of the main pole 15 located away from the medium facing surface 80 to each other so that a first space is defined by the main pole 15, the gap part 17 (the gap layer 18), the write shield 16 and the first return path section. The first portion 10 of the coil passes through the first space.

The magnetic layers 41 to 44 are located on the front side in the direction T of travel of the recording medium 90 relative to the main pole 15, and constitute a second return path section. The second return path section (the magnetic layers 41 to 44) connects the write shield 16 and part of the main pole 15 located away from the medium facing surface 80 to each other so that a second space is defined by the main pole 15, the gap part 17 (the gap layer 19), the write shield 16 and the second return path section. The second portion 20 of the coil passes through the second space.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 also has the function of capturing a magnetic flux that is produced from the end face 15a of the main pole 15 and spreads in directions other than the direction perpendicular to the plane of the recording medium 90, and thereby preventing the magnetic flux from reaching the recording medium 90. Furthermore, the write shield 16, the first return path section (the magnetic layers 31 to 36) and the second return path section (the magnetic layers 41 to 44) have the function of allowing a magnetic flux that has been produced from the end face 15a of the main pole 15 and has magnetized the recording medium 90 to flow back.

The first and second portions 10 and 20 of the coil will now be described in detail with reference to FIG. 8 to FIG. 11. FIG. 8 is a plan view showing the first portion 10. The first portion 10 is wound approximately four turns around the magnetic layer 33. The first portion 10 includes a portion that extends to pass between the magnetic layer 32 and the magnetic layer 33, in particular, within the first space. The first portion 10 has a coil connection 10E electrically connected to the second portion 20.

FIG. 10 is a plan view showing the first layer 21 of the second portion 20. The first layer 21 is wound one turn around the magnetic layer 41. The first layer 21 includes a portion that extends to pass between the top shield 16D and the magnetic layer 41, in particular, within the second space. The first layer 21 has a coil connection 21S electrically connected to the coil connection 10E of the first portion 10, and a coil connection 21E electrically connected to the second layer 22. The coil connection 21S is electrically connected to the coil connection 10E via a first, a second and a third connection layer 11, 12 and 13 of columnar shape (see FIG. 9) which penetrate a plurality of layers interposed between the first layer 21 and the first portion 10. The first to third connection layers 11, 12 and 13 are stacked in this order on the coil connection 10E. The coil connection 21S is disposed on the third connection layer 13. The first to third connection layers 11 to 13 are each formed of a conductive material such as copper.

FIG. 11 is a plan view showing the second layer 22 of the second portion 20. The second layer 22 is wound approximately one turn around the magnetic layer 43. The second layer 22 includes a portion that extends to pass between the magnetic layer 42 and the magnetic layer 43, in particular, within the second space. The second layer 22 has a coil connection 22S penetrating the insulating layer 63 and the insulating film 64 and electrically connected to the coil connection 21E of the first layer 21. In the example shown in FIG. 8 to FIG. 11, the first portion 10 and the second portion 20 are connected in series.

Figure 2:
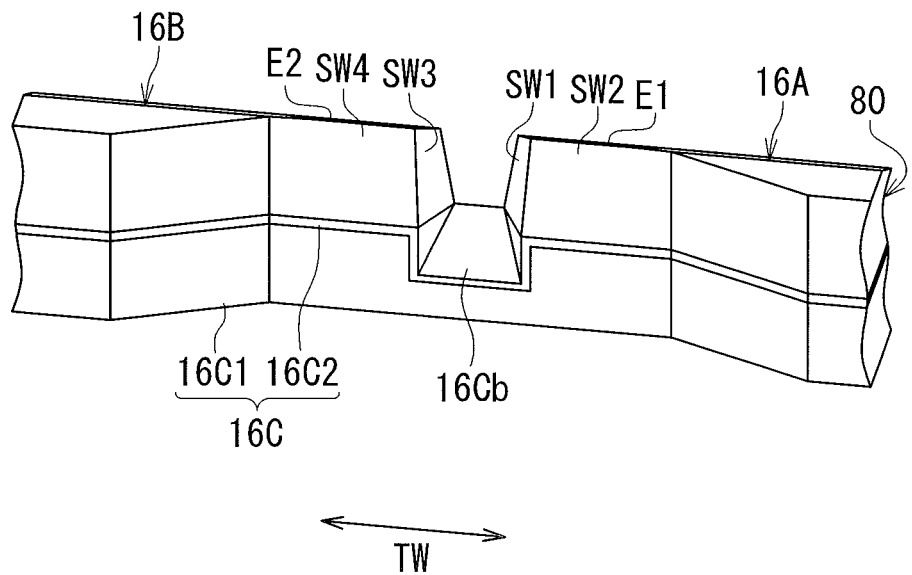
FIG. 2 is a perspective view of part of the first and second side shields in the vicinity of the medium facing surface in the magnetic head according to the embodiment of the invention.
Figure 3:
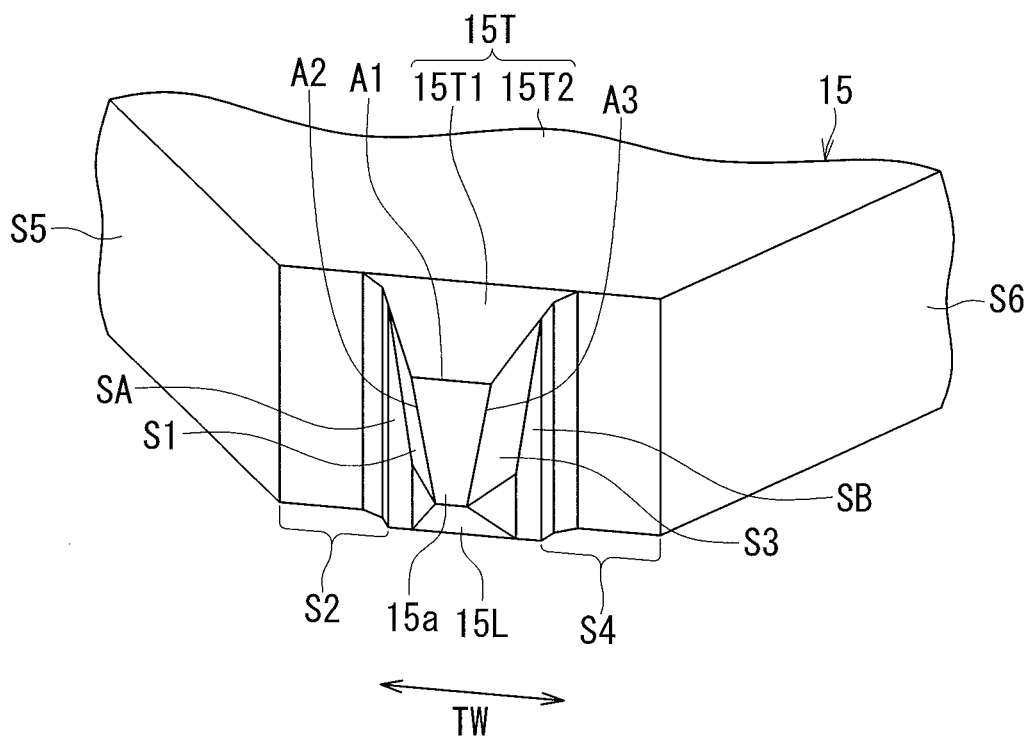
FIG. 3 is a perspective view of part of the main pole in the vicinity of the medium facing surface in the magnetic head according to the embodiment of the invention.
Figure 5:
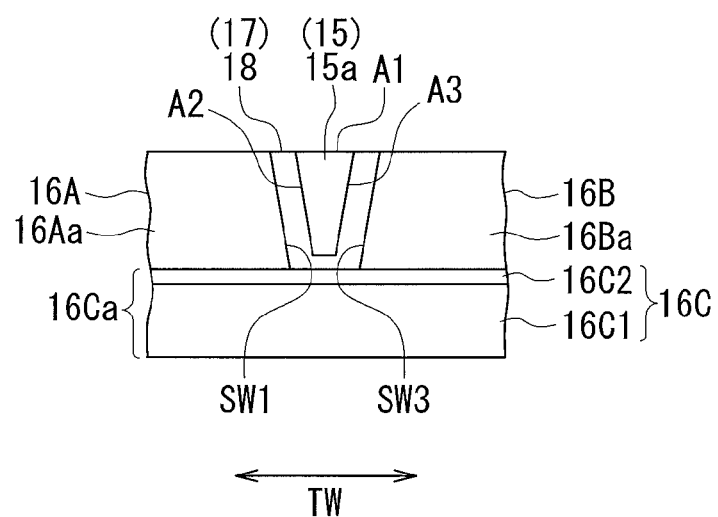
FIG. 5 is a front view showing respective end faces of the main pole and the first and second side shields located in the medium facing surface in the magnetic head according to the embodiment of the invention.

The main pole 15, the first side shield 16A and the second side shield 16B will now be described in detail with reference to FIG. 1 to FIG. 7. FIG. 1 is a perspective view showing part of the main pole 15 and the first and second side shields 16A and 16B in the vicinity of the medium facing surface 80. FIG. 2 is a perspective view of part of the first and second side shields 16A and 16B in the vicinity of the medium facing surface 80. FIG. 3 is a perspective view of part of the main pole 15 in the vicinity of the medium facing surface 80. FIG. 4 is a plan view of part of the main pole 15 and the first and second side shields 16A and 16B in the vicinity of the medium facing surface 80. FIG. 5 is a front view showing respective end faces of the main pole 15 and the first and second side shields 16A and 16B located in the medium facing surface 80.

As shown in FIG. 1, FIG. 2 and FIG. 4, the first side shield 16A has the first end face 16Aa located in the medium facing surface 80, and has a first sidewall SW1 and a second sidewall SW2 facing the main pole 15. The second side shield 16B has the second end face 16Ba located in the medium facing surface 80, and has a third sidewall SW3 and a fourth sidewall SW4 facing the main pole 15. The first sidewall SW1 is connected to the first end face 16Aa. The second sidewall SW2 is connected to the first sidewall SW1, and is located farther from the medium facing surface 80 than is the first sidewall SW1. The third sidewall SW3 is connected to the second end face 16Ba. The fourth sidewall SW4 is connected to the third sidewall SW3, and is located farther from the medium facing surface 80 than is the third sidewall SW3.

As shown in FIG. 2, in any cross section intersecting the first and third sidewalls SW1 and SW3 and parallel to the medium facing surface 80, the distance between the first sidewall SW1 and the third sidewall SW3 in the track width direction TW decreases with increasing proximity to the top surface 1a (see FIG. 6 and FIG. 7) of the substrate 1. Each of the first sidewall SW1 and the third sidewall SW3 forms an angle in the range of, for example, 7° to 17°, preferably in the range of 10° to 15°, with respect to a direction perpendicular to the top surface 1a of the substrate 1.

As shown in FIG. 2 and FIG. 4, the second and fourth sidewalls SW2 and SW4 have their respective edges E1 and E2 farthest from the top surface 1a of the substrate 1. The edges E1 and E2 are parallel to the medium facing surface 80. The edges E1 and E2 are located at an equal distance from the medium facing surface 80, the distance preferably falling within the range of 20 to 120 nm, more preferably within the range of 30 to 90 nm. Here, the distance from the medium facing surface 80 to each of the edges E1 and E2 will be defined as the side shield height SH, and an edge of the top surface of each of the side shields 16A and 16B that faces the main pole 15 will be referred to as the pole-facing edge. The side shield height SH is equal to the distance from the medium facing surface 80 to a point on the pole-facing edge at which the distance between the main pole 15 and the pole-facing edge starts to increase.

The distance from the medium facing surface 80 to an arbitrary point on the second sidewall SW2 may be constant regardless of the distance from the arbitrary point to the top surface 1a of the substrate 1, or may increase or decrease with decreasing distance from the arbitrary point to the top surface 1a of the substrate 1. Similarly, the distance from the medium facing surface 80 to an arbitrary point on the fourth sidewall SW4 may be constant regardless of the distance from the arbitrary point to the top surface 1a of the substrate 1, or may increase or decrease with decreasing distance from the arbitrary point to the top surface 1a of the substrate 1. In all of the above cases, the second sidewall SW2 forms a smaller angle with respect to the direction perpendicular to the top surface 1a of the substrate 1 than does the first sidewall SW1, and the fourth sidewall SW4 forms a smaller angle with respect to the direction perpendicular to the top surface 1a of the substrate 1 than does the third sidewall SW3. In other words, the second sidewall SW2 and the fourth sidewall SW4 are closer to perpendicular to the top surface 1a of the substrate 1 than are the first sidewall SW1 and the third sidewall SW3.

For the case where the distance from the medium facing surface 80 to an arbitrary point on each of the sidewalls SW2 and SW4 increases with decreasing distance from the arbitrary point to the top surface 1a of the substrate 1, the angle formed by each of the sidewalls SW2 and SW4 with respect to the direction perpendicular to the top surface 1a of the substrate 1 will be expressed in positive values. For the case where the distance from the medium facing surface 80 to an arbitrary point on each of the sidewalls SW2 and SW4 decreases with decreasing distance from the arbitrary point to the top surface 1a of the substrate 1, the angle formed by each of the SW2 and SW4 with respect to the direction perpendicular to the top surface 1a of the substrate 1 will be expressed in negative values. The angle formed by each of the sidewalls SW2 and SW4 with respect to the direction perpendicular to the top surface 1a of the substrate 1 preferably falls within the range of −7° to 7°, more preferably within the range of −7° to 0°. When the foregoing angle is 0°, the sidewalls SW2 and SW4 are perpendicular to the top surface 1a of the substrate 1 and parallel to the medium facing surface 80.

The distance between respective top ends of the sidewalls SW1 and SW3 in the track width direction TW may increase with increasing distance from the medium facing surface 80 as shown in FIG. 2 and FIG. 4, or may be constant regardless of distance from the medium facing surface 80.

As shown in FIG. 1, FIG. 3, FIG. 4 and FIG. 6, the main pole 15 has the end face 15a located in the medium facing surface 80, the top surface 15T farthest from the top surface 1a of the substrate 1, the bottom end 15L opposite to the top surface 15T, and first to sixth side surfaces S1, S2, S3, S4, S5 and S6. As shown in FIG. 3, FIG. 5 and FIG. 7, the end face 15a of the main pole 15 has a first side A1 located at an end of the top surface 15T, and has a second side A2 and a third side A3 opposite to each other in the track width direction TW. The first side A1 is in contact with the second gap layer 19. The distance between the second side A2 and the third side A3 in the track width direction TW decreases with increasing proximity to the top surface 1a of the substrate 1. Each of the second side A2 and the third side A3 forms an angle in the range of, for example, 7° to 17°, or preferably in the range of 10° to 15°, with respect to the direction perpendicular to the top surface 1a of the substrate 1. The first side A1 has a length in the range of 0.05 to 0.20 µm, for example.

As shown in FIG. 1 and FIG. 3, the top surface 15T includes an inclined portion 15T1 and a flat portion 15T2, the inclined portion 15T1 being closer to the medium facing surface 80 than the flat portion 15T2. The inclined portion 15T1 has a first end located in the medium facing surface 80 and a second end opposite thereto. The flat portion 15T2 is connected to the second end of the inclined portion 15T1. The inclined portion 15T1 is inclined such that its second end is located on the front side in the direction T of travel of the recording medium 90 relative to its first end. The flat portion 15T2 extends in a direction substantially perpendicular to the medium facing surface 80. As shown in FIG. 6, the bottom surface of the top shield 16D includes a portion that is opposed to the inclined portion 15T1 with the second gap layer 19 interposed therebetween.

As shown in FIG. 6, the bottom 15L includes an inclined portion and a flat portion, the inclined portion being closer to the medium facing surface 80 than the flat portion. The inclined portion of the bottom end 15L has a first end located in the medium facing surface 80 and a second end opposite thereto. The inclined portion of the bottom end 15L may be an edge formed by two intersecting planes, or may be a plane connecting two planes to each other. The flat portion of the bottom end 15L is a plane connected to the second end of the inclined portion of the bottom end 15L. The inclined portion of the bottom end 15L is inclined such that its second end is located on the rear side in the direction T of travel of the recording medium 90 relative to its first end. The flat portion of the bottom end 15L extends in a direction substantially perpendicular to the medium facing surface 80.

As shown in FIG. 1, FIG. 2 and FIG. 5, the bottom shield 16C includes a first layer 16C1, and a second layer 16C2 lying on the first layer 16C1. The top surface 16Cb of the bottom shield 16C is formed by the top surface of the second layer 16C2. As shown in FIG. 6, the inclined portion of the top surface 16Cb of the bottom shield 16C (the top surface of the second layer 16C2) is opposed to the inclined portion of the bottom end 15L with the first gap layer 18 interposed therebetween.

As shown in FIG. 3, the first side surface S1 is connected to the second side A2. The second side surface S2 is located farther from the medium facing surface 80 than is the first side surface S1. The fifth side surface S5 is connected to the second side surface S2, and is located farther from the medium facing surface 80 than is the second side surface S2.

Further, as shown in FIG. 3, the third side surface S3 is connected to the third side A3. The fourth side surface S4 is located farther from the medium facing surface 80 than is the third side surface S3. The sixth side surface S6 is connected to the fourth side surface S4, and is located farther from the medium facing surface 80 than is the fourth side surface S4.

As shown in FIG. 4, the first side surface S1 is opposed to the first sidewall SW1 of the first side shield 16A. The third side surface S3 is opposed to the third sidewall SW3 of the second side shield 16B. As shown in FIG. 3, in any cross section intersecting the first and third side surfaces S1 and S3 and parallel to the end face 15a constituting part of the medium facing surface 80, the distance between the first side surface S1 and the third side surface S3 in the track width direction TW decreases with increasing proximity to the top surface 1a of the substrate 1. The preferred range of the angle formed by each of the side surfaces S1 and S3 with respect to the direction perpendicular to the top surface 1a of the substrate 1 is the same as that for the case of the sidewalls SW1 and SW3.

As shown in FIG. 3, the main pole 15 further has a first connecting surface SA connecting the first side surface S1 and the second side surface S2, and a second connecting surface SB connecting the third side surface S3 and the fourth side surface S4. Each of the first and second connecting surfaces SA and SB has a width that increases with increasing proximity to the top surface 1a of the substrate 1.

As shown in FIG. 4, a portion of the second side surface S2 is opposed to the second sidewall SW2 of the first side shield 16A. A portion of the fourth side surface S4 is opposed to the fourth sidewall SW4 of the second side shield 16B. Hereinafter, the portion of the second side surface S2 opposed to the second sidewall SW2 of the first side shield 16A will be referred to as the first opposed portion. The portion of the fourth side surface S4 opposed to the fourth sidewall SW4 of the second side shield 16B will be referred to as the second opposed portion.

The second side surface S2 includes the first opposed portion, and a first non-opposed portion located between the first opposed portion and the first connecting surface SA. The fourth side surface S4 includes the second opposed portion, and a second non-opposed portion located between the second opposed portion and the second connecting surface SB. FIG. 3 shows an example in which each of the first and second non-opposed portions is composed of two flat surfaces. Alternatively, each of the first and second non-opposed portions may be formed entirely of a single flat or curved surface, or of a combination of a flat surface and a curved surface.

The second side surface S2 forms a smaller angle with respect to the direction perpendicular to the top surface 1a of the substrate 1 than does the first side surface S1, and the fourth side surface S4 forms a smaller angle with respect to the direction perpendicular to the top surface 1a of the substrate 1 than does the third side surface S3. In other words, the second side surface S2 and the fourth side surface S4 are closer to perpendicular to the top surface 1a of the substrate 1 than are the first side surface S1 and the third side surface S3. The preferred range of the angle formed by each of the side surfaces S2 and S4 with respect to the direction perpendicular to the top surface 1a of the substrate 1 is the same as that for the case of the sidewalls SW2 and SW4.

The distance from the medium facing surface 80 to an arbitrary point on the first opposed portion may be constant regardless of the distance from the arbitrary point to the top surface 1a of the substrate 1, or may increase or decrease with decreasing distance from the arbitrary point to the top surface 1a of the substrate 1. Similarly, the distance from the medium facing surface 80 to an arbitrary point on the second opposed portion may be constant regardless of the distance from the arbitrary point to the top surface 1a of the substrate 1, or may increase or decrease with decreasing distance from the arbitrary point to the top surface 1a of the substrate 1.

In any cross section intersecting the first and second non-opposed portions and parallel to the end face 15a constituting part of the medium facing surface 80, the distance between the first non-opposed portion and the second non-opposed portion in the track width direction TW may be constant regardless of distance from the top surface 1a of the substrate 1, or may increase or decrease with increasing proximity to the top surface 1a of the substrate 1.

FIG. 1 and FIG. 3 show an example in which the distance from the medium facing surface 80 to the boundary between the inclined portion 15T1 and the flat portion 15T2 of the top surface 15T is equal to the distance from the medium facing surface 80 to each of the respective top ends of the first and second opposed portions of the second and fourth side surfaces S2 and S4. Alternatively, however, the distance from the medium facing surface 80 to the aforementioned boundary may be smaller or greater than the distance from the medium facing surface 80 to each of the aforementioned top ends.

Similarly, FIG. 3 shows an example in which the distance from the medium facing surface 80 to the boundary between the inclined portion and the flat portion of the bottom end 15L is equal to the distance from the medium facing surface 80 to each of the respective bottom ends of the first and second connecting surfaces SA and SB. Alternatively, however, the distance from the medium facing surface 80 to the aforementioned boundary may be smaller or greater than the distance from the medium facing surface 80 to each of the aforementioned bottom ends.

In any cross section intersecting the fifth and sixth side surfaces S5 and S6 and parallel to the end face 15a constituting part of the medium facing surface 80, the distance between the fifth side surface S5 and the sixth side surface S6 in the track width direction TW may be constant regardless of distance from the top surface 1a of the substrate 1, or may increase or decrease with increasing proximity to the top surface 1a of the substrate 1. In all of the above cases, the fifth side surface S5 forms a smaller angle with respect to the direction perpendicular to the top surface 1a of the substrate 1 than does the first side surface S1, and the sixth side surface S6 forms a smaller angle with respect to the direction perpendicular to the top surface 1a of the substrate 1 than does the third side surface S3.

For the case where the distance between the fifth and sixth side surfaces S5 and S6 in the track width direction TW decreases with increasing proximity to the top surface 1a of the substrate 1 in any cross section intersecting the side surfaces S5 and S6 and parallel to the end face 15a constituting part of the medium facing surface 80, the angle formed by each of the side surfaces S5 and S6 with respect to the direction perpendicular to the top surface 1a of the substrate 1 will be expressed in positive values. For the case where the distance between the fifth and sixth side surfaces S5 and S6 in the track width direction TW increases with increasing proximity to the top surface 1a of the substrate 1 in any cross section intersecting the side surfaces S5 and S6 and parallel to the end face 15a constituting part of the medium facing surface 80, the angle formed by each of the side surfaces S5 and S6 with respect to the direction perpendicular to the top surface 1a of the substrate 1 will be expressed in negative values. The angle formed by each of the side surfaces S5 and S6 with respect to the direction perpendicular to the top surface 1a of the substrate 1 preferably falls within the range of −7° to 7°, more preferably within the range of −7° to 0°. When the foregoing angle is 0°, the distance between the fifth side surface S5 and the sixth side surface S6 in the track width direction TW is constant regardless of distance from the top surface 1a of the substrate 1 in any cross section intersecting the fifth and sixth side surfaces S5 and S6 and parallel to the end face 15a constituting part of the medium facing surface 80.

The distance between respective top ends of the side surfaces S1 and S3 in the track width direction TW may increase with increasing distance from the medium facing surface 80 as shown in FIG. 3 and FIG. 4, or may be constant regardless of distance from the medium facing surface 80.

As shown in FIG. 1 and FIG. 4, the first gap layer 18 is disposed along the first to fourth sidewalls SW1 to SW4. As shown in FIG. 4, the first gap layer 18 includes a first portion 18A interposed between the first sidewall SW1 and the first side surface S1 and between the second sidewall SW2 and the second side surface S2, and a second portion 18B interposed between the third sidewall SW3 and the third side surface S3 and between the fourth sidewall SW4 and the fourth side surface S4. Since the first gap layer 18 is a portion of the gap part 17, the gap part 17 can be said to include the first and second portions 18A and 18B.

As shown in FIG. 4, the nonmagnetic layer 61 is present between the fifth side surface S5 of the main pole 15 and the first side shield 16A, and between the sixth side surface S6 of the main pole 15 and the second side shield 16B. On the other hand, any portion of the nonmagnetic layer 61 is not present between the first sidewall SW1 and the first side surface S1, between the second sidewall SW2 and the second side surface S2, between the third sidewall SW3 and the third side surface S3, and between the fourth sidewall SW4 and the fourth side surface S4. Consequently, the distance between the fifth side surface S5 and the first side shield 16A is greater than the distance between the first side surface S1 and the first sidewall SW1 and the distance between the second side surface S2 and the second sidewall SW2. Likewise, the distance between the sixth side surface S6 and the second side shield 16B is greater than the distance between the third side surface S3 and the third sidewall SW3 and the distance between the fourth side surface S4 and the fourth sidewall SW4. The nonmagnetic layer 61 has the function of magnetically separating the main pole 15 from the side shields 16A and 16B at locations away from the medium facing surface 80.

A manufacturing method for the magnetic head according to the embodiment will now be described. In the manufacturing method for the magnetic head according to the embodiment, first, as shown in FIG. 6 and FIG. 7, the insulating layer 2, the first read shield layer 3, and the first read shield gap film 4 are formed in this order on the substrate 1. Next, the MR element 5 and leads (not illustrated) connected to the MR element 5 are formed on the first read shield gap film 4. The MR element 5 and the leads are then covered with the second read shield gap film 6. Then, the second read shield layer 7, the nonmagnetic layer 71, the middle shield layer 72, and the nonmagnetic layer 73 are formed in this order on the second read shield gap film 6.

Next, the magnetic layer 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the magnetic layer 31 is exposed. Next, the magnetic layers 32 and 33 are formed on the magnetic layer 31 by frame plating, for example. The insulating film 52 is then formed over the entire top surface of the stack. Next, the first portion 10 of the coil is formed by frame plating, for example. The insulating layer 53 is then formed in the space between adjacent turns of the first portion 10. Next, the insulating layer 54 is formed over the entire top surface of the stack. The insulating layer 54 is then polished by, for example, CMP, until the first portion 10, the magnetic layers 32 and 33 and the insulating layer 53 are exposed.

Next, the insulating layer 55 is formed over the entire top surface of the stack. The insulating layer 55 is then selectively etched to form therein a first opening for exposing the top surface of the magnetic layer 32, a second opening for exposing the top surface of the magnetic layer 33, and a third opening for exposing the coil connection 10E (see FIG. 8) of the first portion 10. Then, frame plating, for example, is performed so that the magnetic layer 34 is formed on the magnetic layer 32 at the position of the first opening, the magnetic layer 35 is formed on the magnetic layer 33 at the position of the second opening, and the first connection layer 11 (see FIG. 9) is formed on the coil connection 10E at the position of the third opening. Next, the insulating layer 56 is formed over the entire top surface of the stack. The insulating layer 56 is then polished by, for example, CMP, until the magnetic layers 34 and 35 and the first connection layer 11 are exposed.

Next, frame plating, for example, is performed to form an initial first layer that will later become the first layer 16C1 of the bottom shield 16C, to form the magnetic layer 36 on the magnetic layer 35, and to form the second connection layer 12 (see FIG. 9) on the first connection layer 11. Next, the nonmagnetic layer 57 is formed over the entire top surface of the stack. The nonmagnetic layer 57 is then polished by, for example, CMP, until the initial first layer, the magnetic layer 36 and the second connection layer 12 are exposed. Then, the initial first layer and the nonmagnetic layer 57 are taperetched in part by, for example, ion beam etching, so as to provide the top surface of the initial first layer with a portion to be opposed to the inclined portion of the bottom end 15L of the main pole 15 to be formed later. The initial first layer thereby becomes the first layer 16C1.

Next, the second layer 16C2 of the bottom shield 16 is formed over the first layer 16C1 and the nonmagnetic layer 57 by sputtering or ion beam deposition, for example. The second layer 16C2 will later serve as a seed layer when plating is performed to form a magnetic layer to become the side shields 16A and 16B on the top surface 16Cb of the bottom shield 16C. The second layer 16C2 except a portion lying on the first layer 16C1 will be removed later by etching. The first layer 16C1 and the etched second layer 16C2 form the bottom shield 16C. In the following description, for the sake of convenience, the stack of the first layer 16C1 and the second layer 16C2 will be referred to as the bottom shield 16C even before the second layer 16C2 is etched.

Reference is now made to FIG. 13 to FIG. 23 to describe a series of steps to be performed after the foregoing step up to the formation of an initial main pole which will later become the main pole 15. FIG. 13 to FIG. 23 each show a stack of layers formed in the process of manufacturing the magnetic head. FIG. 13 and FIG. 18 to FIG. 23 each show the top surface of part of the stack. FIG. 14 to FIG. 17 each show a cross section of the stack taken at the position at which the medium facing surface 80 is to be formed. In FIG. 13 and FIG. 18 to FIG. 23, the symbol "ABS" indicates the position at which the medium facing surface 80 is to be formed.

Figure 13:
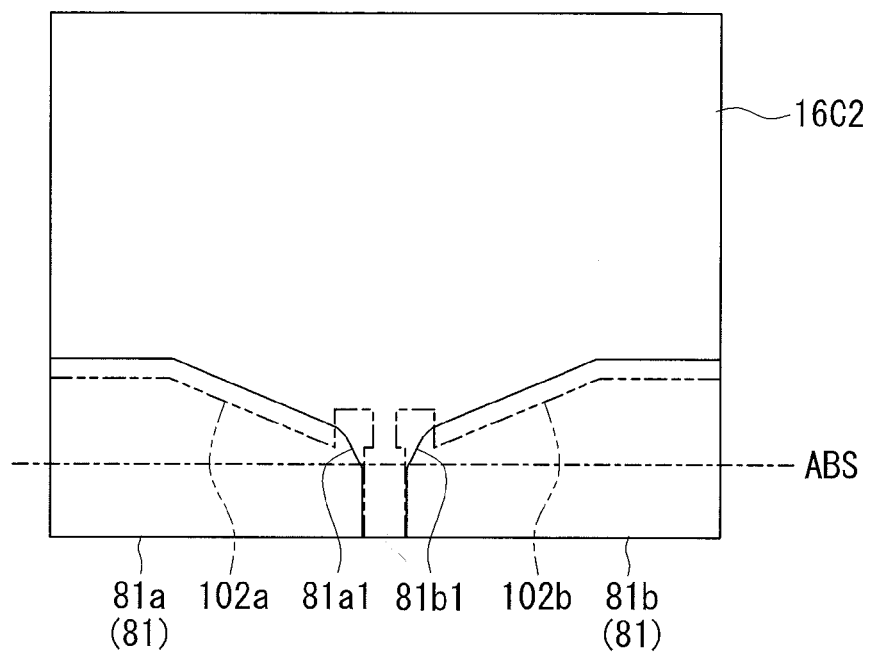
FIG. 13 is a plan view showing a step of the manufacturing method for the magnetic head according to the embodiment of the invention.

FIG. 13 shows a step that follows the formation of the second layer 16C2. In this step, a photoresist layer of a positive photoresist is patterned by photolithography to form a first resist layer 81 on a region of the top surface 16Cb of the bottom shield 16C (the top surface of the second layer 16C2) where the side shields 16A and 16B are to be formed later. The first resist layer 81 includes a portion 81a shaped to correspond to the shape of the first side shield 16A to be formed later, and a portion 81b shaped to correspond to the shape of the second side shield 16B to be formed later. More specifically, in this step, first, the photoresist layer of a positive photoresist is formed over the entire top surface of the stack. The photoresist layer is formed such that its top surface is higher in level than the top surfaces of the first and second side shields 16A and 16B to be formed later.

Figure 12:
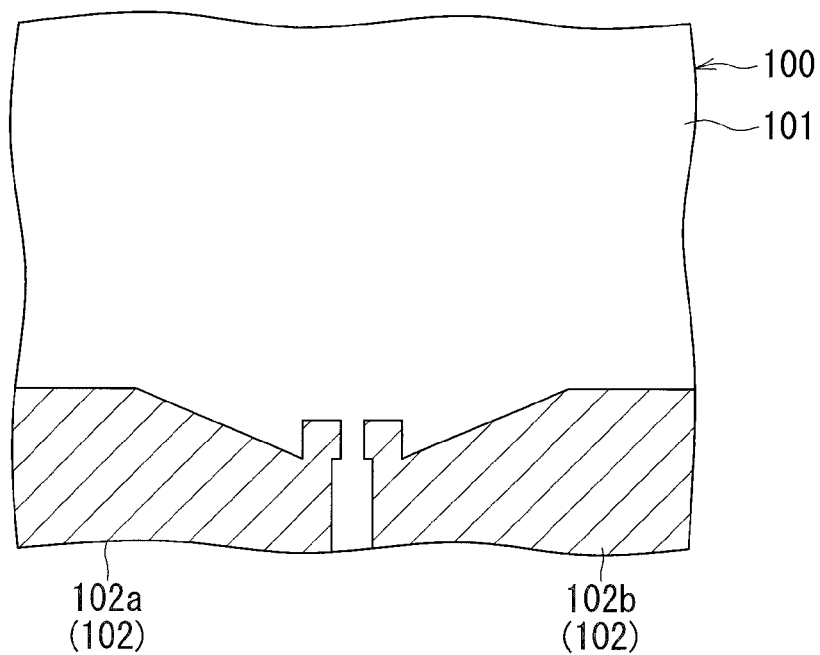
FIG. 12 is a plan view showing the shape of a portion of a photomask to be used in a manufacturing method for the magnetic head according to the embodiment of the invention.

Next, the photoresist layer is selectively exposed to light using a photomask. When exposing the photoresist layer to light, optical proximity correction (hereinafter referred to as OPC) may be employed to form the first resist layer 81 into a shape closer to a desired one. In OPC, the pattern of the photomask is determined so that the photoresist layer to be patterned by photolithography will have a shape closer to a desired one. FIG. 12 is a plan view showing the shape of the photomask in the case of employing OPC in this step. The photomask 100 shown in FIG. 12 has a light-transmitting part 101 which allows the light for exposure to pass therethrough, and a light-blocking part 102 which blocks the light for exposure. The light-blocking part 102 includes a portion 102a shaped to correspond to the planar shape of the first side shield 16A to be formed later, and a portion 102b shaped to correspond to the planar shape of the second side shield 16B to be formed later. In FIG. 13, the portions 102a and 102b are shown by chain double-dashed lines. Next, the exposed photoresist layer is developed. As a result of the exposure, the area of the photoresist layer irradiated with the light having passed through the light-transmitting part 101 of the photomask 100 becomes soluble in a developing solution, while the other area remains insoluble in the developing solution. The photoresist layer remaining after the development makes the first resist layer 81.

The portion 81a of the first resist layer 81 has a wall face 81a1 which includes a portion corresponding to the first sidewall SW1 of the first side shield 16A to be formed later. The portion 81b of the first resist layer 81 has a wall face 81b1 which includes a portion corresponding to the third sidewall SW3 of the second side shield 16B to be formed later. In this step, the photoresist layer is patterned so that both the wall faces 81a1 and 81b1 become inclined relative to the direction perpendicular to the top surface 1a of the substrate 1 and that the distance between the portion of the wall face 81a1 corresponding to the sidewall SW1 and the portion of the wall face 81b1 corresponding to the sidewall SW3 decreases with increasing proximity to the top surface 1a (see FIG. 6) of the substrate 1. Such patterning can be accomplished by using a photoresist layer that consists of a lower layer of low sensitivity and an upper layer of high sensitivity. When viewed from above, in a region other than the location at which the first sidewall SW1 is to be formed, the portion 81a of the first resist layer 81 covers a larger area than the area in which the first side shield 16A is to be formed. When viewed from above, in a region other than the location at which the third sidewall SW3 is to be formed, the portion 81b of the first resist layer 81 covers a larger area than the area in which the second side shield 16B is to be formed.

Figure 14:
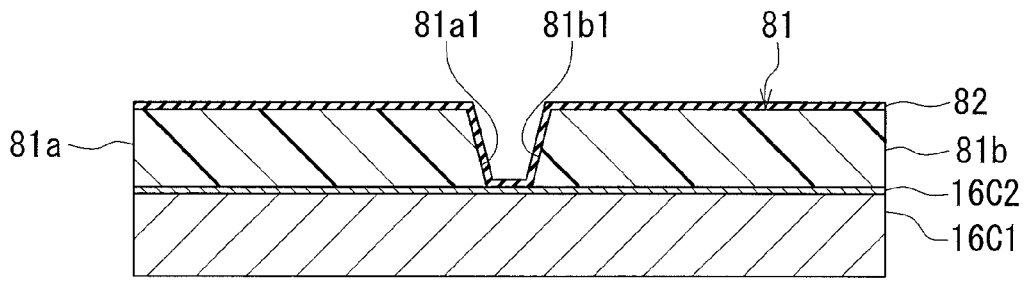
FIG. 14 is a cross-sectional view showing a step that follows the step of FIG. 13.

FIG. 14 shows the next step. In this step, a separating film 82 of a nonmagnetic material is formed to cover the first resist layer 81. The separating film 82 is provided to prevent the first resist layer 81 of a positive photoresist from being mixed with a photoresist layer of a negative photoresist that will be formed later. The separating film 82 has a thickness in the range of 5 to 20 nm, for example. The separating film 82 may be formed of alumina or a synthetic resin, for example. Where alumina is selected as the material for the separating film 82, the separating film 82 is formed by ion beam deposition, for example.

Figure 15:
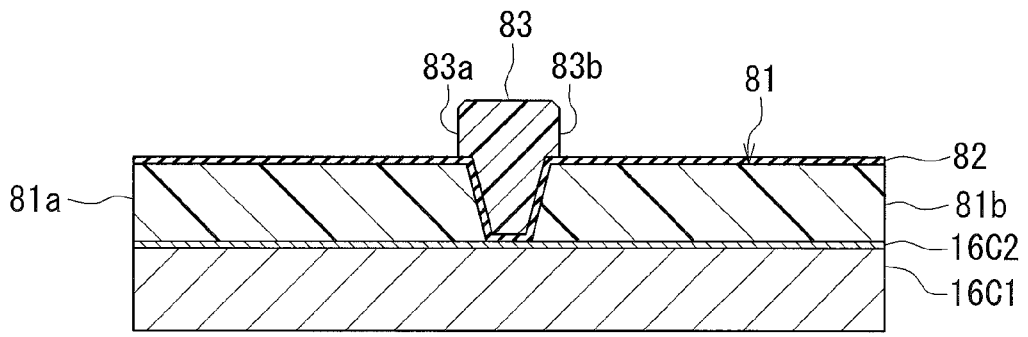
FIG. 15 is a cross-sectional view showing a step that follows the step of FIG. 14.

FIG. 15 shows the next step. In this step, a photoresist layer of a negative photoresist is patterned by photolithography to form a second resist layer 83 on the separating film 82. The second resist layer 83 has an opening 83a shaped to correspond to the shape of the first side shield 16A to be formed later, and an opening 83b shaped to correspond to the shape of the second side shield 16B to be formed later. More specifically, in this step, first, the photoresist layer of a negative photoresist is formed over the entire top surface of the stack. The photoresist layer is formed such that its top surface is higher in level than the top surface of a portion of the separating film 82 that lies on the first resist layer 81. Next, the photoresist layer is selectively exposed to light using a photomask. The photomask has a light-transmitting part which allows the light for exposure to pass therethrough, and a light-blocking part which blocks the light for exposure, as does the photomask 100 used when forming the first resist layer 81. The light-blocking part of the photomask includes portions shaped to correspond to the planar shape of the first and second side shields 16A and 16B to be formed later. Next, the exposed photoresist layer is developed. As a result of the exposure, the area of the photoresist layer irradiated with the light having passed through the light-transmitting part of the photomask becomes insoluble in the developing solution, while the other area remains soluble in the developing solution. The photoresist layer remaining after the development makes the second resist layer 83. In this step, OPC may be employed as in the step of forming the first resist layer 81.

Figure 16:
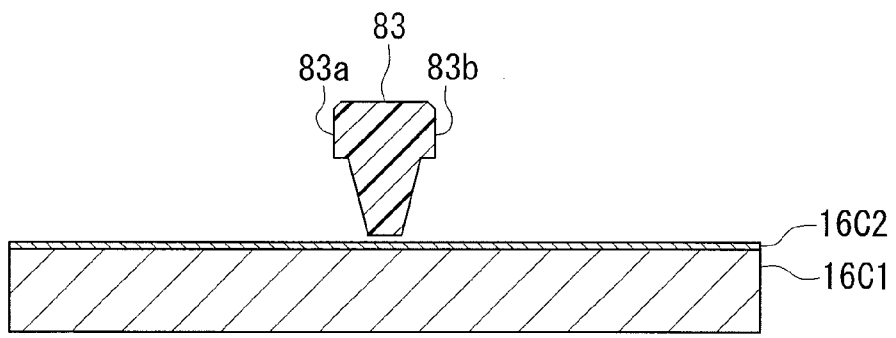
FIG. 16 is a cross-sectional view showing a step that follows the step of FIG. 15.

FIG. 16 shows the next step. In this step, first, portions of the separating film 82 that are not covered with the second resist layer 83 are removed by wet etching, for example. Next, the first and second resist layers 81 and 83 are exposed to light and then the first resist layer 81 is removed from the openings 83a and 83b of the second resist layer 83. More specifically, first, the entire top surface of the stack is exposed to light. The exposure causes the first resist layer 81 of a positive photoresist to become soluble in a developing solution, and allows the second resist layer 83 of a negative photoresist to remain insoluble in the developing solution. Next, the first resist layer 81 is removed using an alkaline developing solution, for example. In this step, portions of the separating film 82 extending along the wall faces of the openings 83a and 83b of the second resist layer 83 are also removed when or after the first resist layer 81 is removed. In this step, as shown in FIG. 16, a portion of the separating film 82 lying under a narrow portion of the second resist layer 83 may also be removed. Even in such a case, the second resist layer 83 will not peel away since a portion of the separating film 82 lying under a thick portion of the second resist layer 83 remains.

Figure 17:
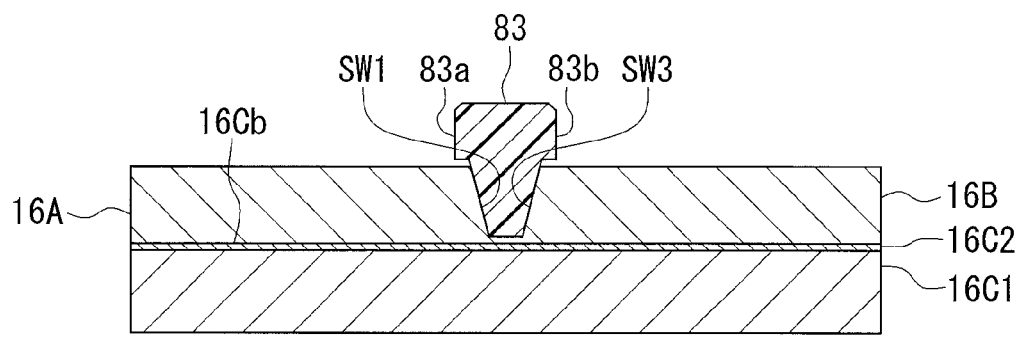
FIG. 17 is a cross-sectional view showing a step that follows the step of FIG. 16.
Figure 18:
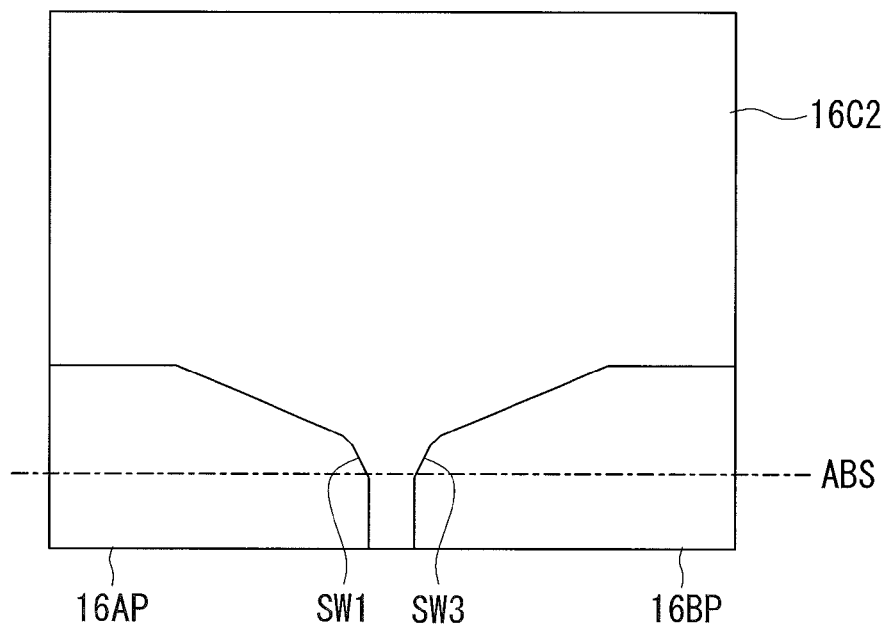
FIG. 18 is a plan view showing a step that follows the step of FIG. 17.

FIG. 17 shows the next step. In this step, after the removal of the first resist layer 81, a first initial side shield 16AP and a second initial side shield 16BP are formed on the top surface 16Cb of the bottom shield 16C (the top surface of the second layer 16C2) by performing plating without forming a seed layer. The second layer 16C2 of the bottom shield 16C is used as a seed layer and an electrode when forming the initial side shields 16AP and 16BP. The initial side shields 16AP and 16BP are formed in the openings 83a and 83b of the second resist layer 83, respectively. The first initial side shield 16AP has the first sidewall SW1 of the first side shield 16A to be formed later, and is larger in planar shape (the shape as viewed from above) than the first side shield 16A. The second initial side shield 16BP has the third sidewall SW3 of the second side shield 16B to be formed later, and is larger in planar shape than the second side shield 16B. Next, as shown in FIG. 18, the second resist layer 83 and the separating film 82 are removed.

Figure 19:
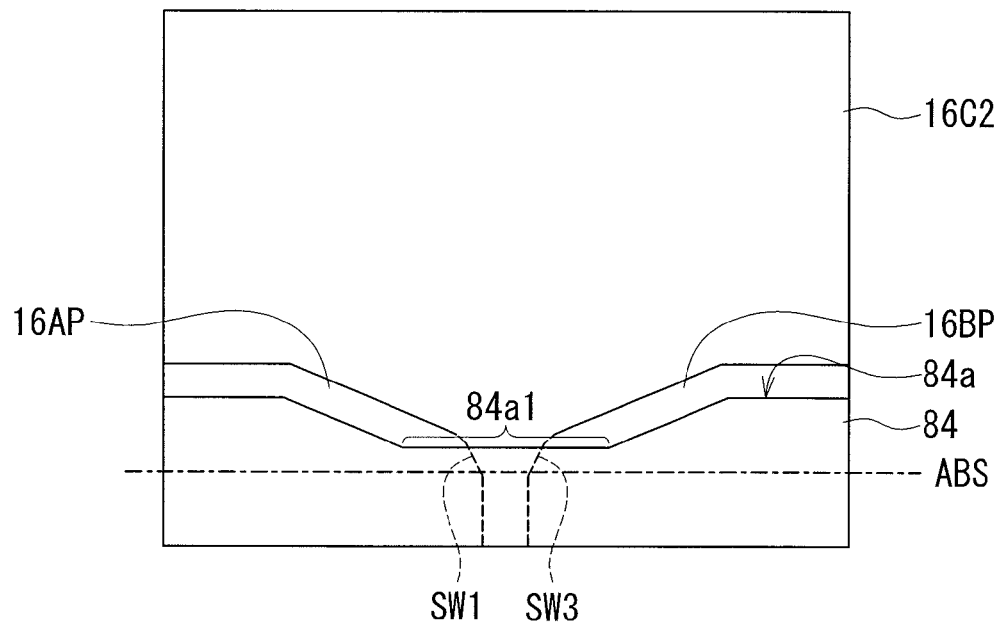
FIG. 19 is a plan view showing a step that follows the step of FIG. 18.

FIG. 19 shows the next step. In this step, a mask 84 is formed over the bottom shield 16C and the first and second initial side shields 16AP and 16BP. The mask 84 is formed by patterning a photoresist layer. The mask 84 has a wall face 84a including a portion 84a1 that defines the position of the second sidewall SW2 of the first side shield 16A to be formed later and the position of the fourth sidewall SW4 of the second side shield 16B to be formed later. The mask 84 does not cover a portion of the second layer 16C2 of the bottom shield 16C other than a portion lying on the first layer 16C1.

Figure 20:
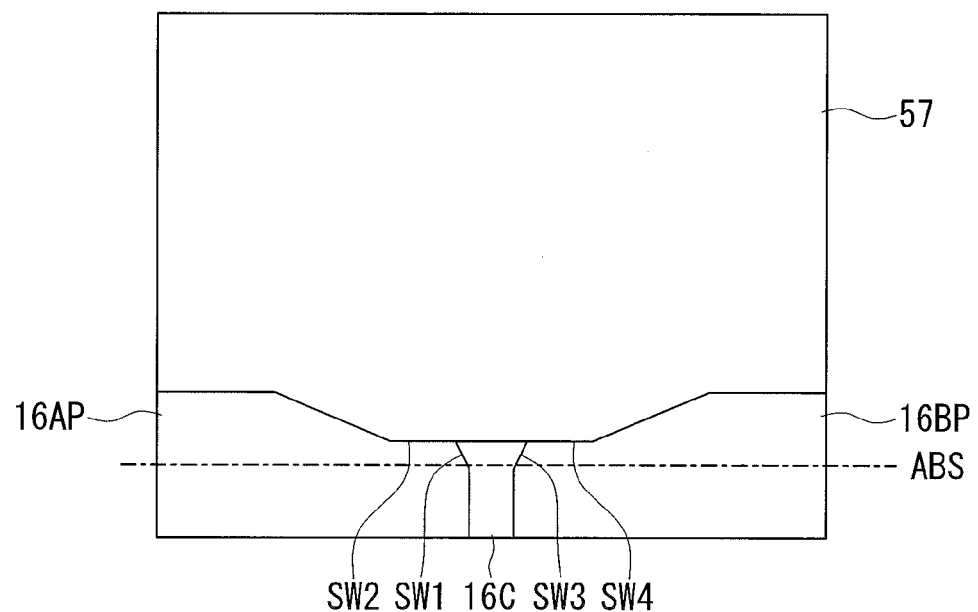
FIG. 20 is a plan view showing a step that follows the step of FIG. 19.

FIG. 20 shows the next step. In this step, first, using the mask 84 as an etching mask, a portion of the first initial side shield 16AP and a portion of the second initial side shield 16BP are etched by, for example, ion beam etching, so that the first initial side shield 16AP is provided with the second sidewall SW2 and the second initial side shield 16BP is provided with and the fourth sidewall SW4. Further, at the same time the initial side shields 16AP and 16BP are etched, the second layer 16C2 except the portion lying on the first layer 16C1 is removed by etching. This completes the bottom shield 16C composed of the first layer 16C1 and the second layer 16C2 lying thereon. The mask 84 is then removed.

Figure 21:
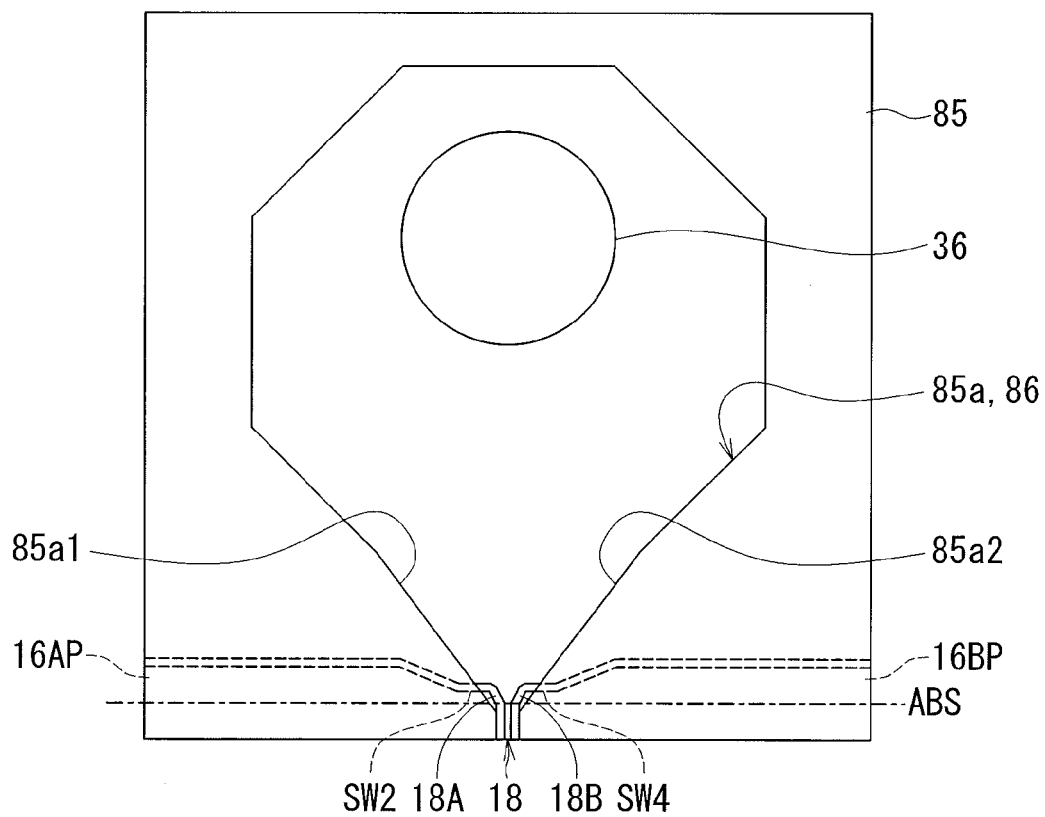
FIG. 21 is a plan view showing a step that follows the step of FIG. 20.

FIG. 21 shows the next step. In this step, the first gap layer 18 is formed over the entire top surface of the stack. Where alumina is selected as the material of the first gap layer 18, the first gap layer 18 is formed by atomic layer deposition (ALD), for example. Where Ru is selected as the material of the first gap layer 18, the first gap layer 18 is formed by chemical vapor deposition (CVD), for example. The first gap layer 18 includes the first and second portions 18A and 18B described previously. Next, the first gap layer 18 is selectively etched to form therein an opening for exposing the top surface of the magnetic layer 36 (see FIG. 6) and an opening for exposing the top surface of the second connection layer 12 (see FIG. 9).

Next, a photoresist layer is formed over the entire top surface of the stack. The photoresist layer is then patterned by photolithography to form a mold 85. The mold 85 is formed such that its top surface is higher in level than the top surfaces of portions of the first gap layer 18 lying on the first and second initial side shields 16AP and 16BP. The mold 85 has an opening 85a for receiving the main pole 15 and an opening for receiving the third connection layer 13 (see FIG. 9). The first initial side shield 16AP, the second initial side shield 16BP, the first gap layer 18 and the mold 85 (the opening 85a) form a receiving portion 86 for receiving the main pole 15.

The opening 85a of the mold 85 has a first inner wall 85a1 defining the shape of the fifth side surface S5 of the main pole 15 and a second inner wall 85a2 defining the shape of the sixth side surface S6 of the main pole 15. When viewed from above, the first inner wall 85a1 intersects a portion of the first gap layer 18 that extends along the second sidewall SW2 of the first initial side shield 16AP. When viewed from above, the second inner wall 85a2 intersects a portion of the first gap layer 18 that extends along the fourth sidewall SW4 of the second initial side shield 16BP. Further, when viewed from above, the first and second inner walls 85a1 and 85a2 are located outwardly from the positions at which the first and third side surfaces S1 and S3 of the main pole 15 are to be formed.

Figure 22:
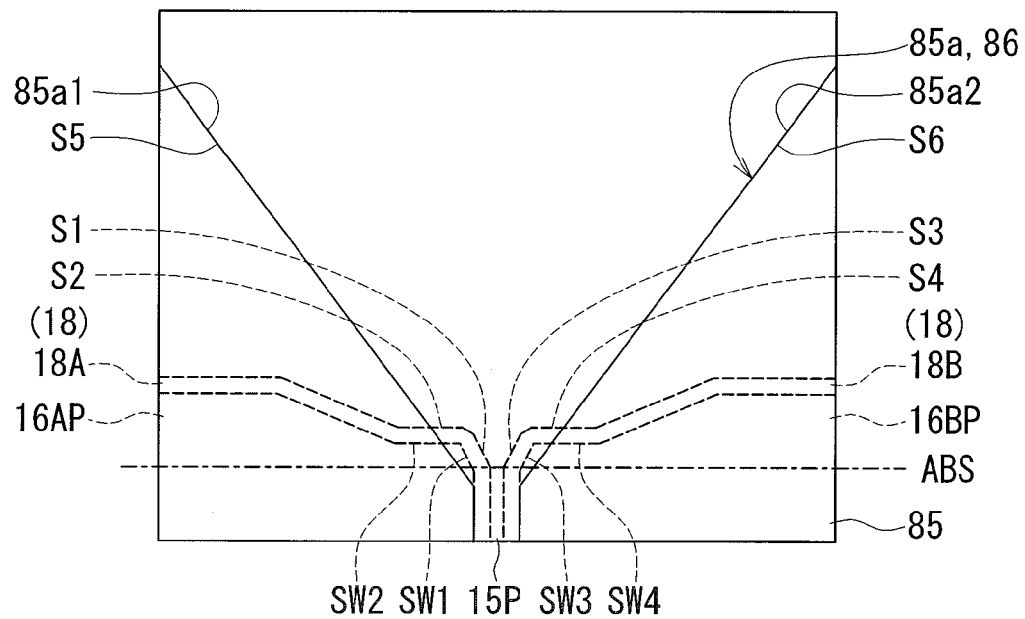
FIG. 22 is a plan view showing a step that follows the step of FIG. 21.

FIG. 22 shows the next step. In this step, an initial main pole 15P which will later become the main pole 15 is formed by plating so as to be received in the receiving portion 86. The initial main pole 15P has the first to sixth side surfaces S1 to S6 and the first and second connecting surfaces SA and SB. As shown in FIG. 22, the shape of the first side surface S1 is defined by the first sidewall SW1 of the first initial side shield 16AP and a portion of the first gap layer 18 that extends along the first sidewall SW1. The shape of the second side surface S2 is defined by the second sidewall SW2 of the first initial side shield 16AP and the portion of the first gap layer 18 that extends along the second sidewall SW2. The shape of the fifth side surface S5 is defined by the first inner wall 85a1 of the mold 85.

Further, as shown in FIG. 22, the shape of the third side surface S3 is defined by the third sidewall SW3 of the second initial side shield 16BP and a portion of the first gap layer 18 that extends along the third sidewall SW3. The shape of the fourth side surface S4 is defined by the fourth sidewall SW4 of the second initial side shield 16BP and the portion of the first gap layer 18 that extends along the fourth sidewall SW4.

The shape of the sixth side surface S6 is defined by the second inner wall 85*a*2 of the mold 85.

Further, the third connection layer 13 (see FIG. 9) is formed on the second connection layer 12 by plating, for example. The initial main pole 15P and the third connection layer 13 are formed such that their top surfaces are higher in level than the top surfaces of the portions of the first gap layer 18 lying on the initial side shields 16AP and 16BP. The mold 85 is then removed.

Reference is now made to FIG. 6 and FIG. 7 to describe steps to follow the formation of the initial main pole 15 and the third connection layer 13. First, the nonmagnetic layer 61 is formed over the entire top surface of the stack. The nonmagnetic layer 61 is then polished until the top surfaces of the first and second initial side shields 16AP and 16BP are exposed. Next, the nonmagnetic metal layer 58 and the insulating layer 59 are formed over the initial main pole 15P and the initial side shields 16AP and 16BP. The initial main pole 15P, the initial side shields 16AP and 16BP and the nonmagnetic layer 61 are then etched in part by, for example, ion beam etching using the nonmagnetic metal layer 58 and the insulating layer 59 so that the initial main pole 15 is provided with the inclined portion 15T1. A portion of the top surface of the etched initial main pole 15P, the portion being covered with the nonmagnetic metal layer 58 and the insulating layer 59, makes the flat portion 15T2.

Next, the second gap layer 19 is formed over the entire top surface of the stack by sputtering or chemical vapor deposition, for example. The second gap layer 19, the nonmagnetic metal layer 58 and the insulating layer 59 are then selectively etched by, for example, ion beam etching, so that a portion of the top surface of the initial main pole 15P, a portion of the top surface of each of the initial side shields 16AP and 16BP, and the top surface of the third connection layer 13 are exposed. Next, the top shield 16D is formed over the initial side shields 16AP and 16BP and the second gap layer 19, and the magnetic layer 41 is formed on the initial main pole 15P by, for example, frame plating.

Next, the insulating film 62 is formed over the entire top surface of the stack. The insulating film 62 is then selectively etched to form therein an opening for exposing the top surface of the third connection layer 13. Next, the first layer 21 of the second portion 20 of the coil is formed by frame plating, for example. Then, the first nonmagnetic layer, not illustrated, is formed over the entire top surface of the stack. The first nonmagnetic layer is then polished by, for example, CMP, until the first layer 21, the top shield 16D and the magnetic layer 41 are exposed.

Next, the insulating layer 63 is formed over the entire top surface of the stack. The insulating layer 63 is then selectively etched to form therein a first opening for exposing the top surface of the top shield 16D and a second opening for exposing the top surface of the magnetic layer 41. Then, frame plating, for example, is performed so that the magnetic layer 42 is formed on the top shield 16D at the position of the first opening and the magnetic layer 43 is formed on the magnetic layer 41 at the position of the second opening.

Next, the insulating film 64 is formed over the entire top surface of the stack. The insulating layer 63 and the insulating film 64 are then selectively etched to form therein openings for exposing the coil connection 21E (see FIG. 10) of the first layer 21. Next, the second layer 22 of the second portion 20 of the coil is formed by frame plating, for example. Then, the second nonmagnetic layer, not illustrated, is formed over the entire top surface of the stack. The second nonmagnetic layer is then polished by, for example, CMP, until the second layer 22 and the magnetic layers 42 and 43 are exposed.

Next, the insulating layer 65 is formed over the entire top surface of the stack. The insulating layer 65 is then selectively etched to form therein an opening for exposing the top surface of the magnetic layer 42 and an opening for exposing the top surface of the magnetic layer 43. Next, the magnetic layer 44 is formed by frame plating, for example. The top shield 16D and the magnetic layers 42 and 44 are then etched by, for example, reactive ion etching or ion beam etching so as to provide the top shield 16D with the connecting surface mentioned previously and provide the magnetic layers 42 and 44 with the respective end faces mentioned previously. Next, the nonmagnetic layer 66 is formed over the entire top surface of the stack. The nonmagnetic layer 66 is then polished by, for example, CMP, until the magnetic layer 44 is exposed.

Figure 23:
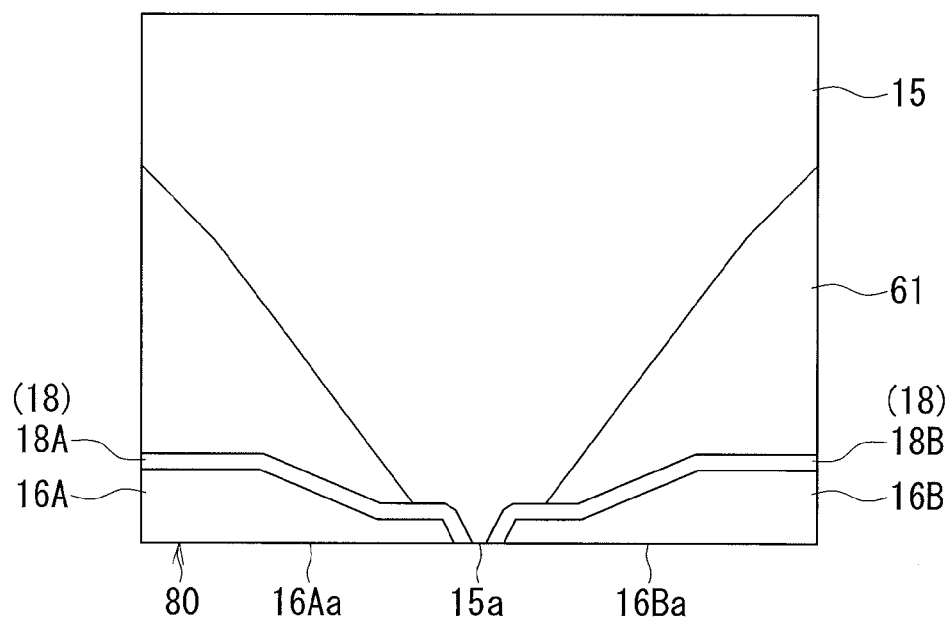
FIG. 23 is a plan view showing the step of forming the medium facing surface in the manufacturing method for the magnetic head according to the embodiment of the invention.

Next, the protective layer 70 is formed to cover the entire top surface of the stack. Wiring, terminals and other components are then formed on the protective layer 70, and the substrate 1 is cut near the position ABS at which the medium facing surface 80 is to be formed. Next, as shown in FIG. 23, the cut surface is polished to form the medium facing surface 80 so that the first initial side shield 16AP becomes the first side shield 16A, the second initial side shield 16BP becomes the second side shield 16B, and the initial main pole 15P becomes the main pole 15. Then, fabrication of flying rails and other processes are performed to complete the magnetic head.

As has been described, the manufacturing method for the magnetic head according to the embodiment includes: the step of forming the first initial side shield 16AP having the first sidewall SW1 and the second initial side shield 16BP having the third sidewall SW3 (see FIG. 18); the etching step (see FIG. 20) of etching a portion of the first initial side shield 16AP and a portion of the second initial side shield 16BP so that the first initial side shield 16AP is provided with the second sidewall SW2 and the second initial side shield 16BP is provided with the fourth sidewall SW4; the step of forming the first and second portions 18A and 18B of the gap part 17 (the gap layer 18) (see FIG. 21) after the etching step; the step of forming the initial main pole 15P (see FIG. 22) after the step of forming the first and second portions 18A and 18B of the gap part 17; the step of forming the coil; and the step of forming the medium facing surface 80 (see FIG. 23). The manufacturing method for the magnetic head according to the embodiment further includes the step of forming the mold 85 (see FIG. 21) having the first and second inner walls 85*a*1 and 85*a*2 defining the shapes of the fifth and sixth side surfaces S5 and S6 of the main pole 15, respectively. The step of forming the mold 85 is performed between the step of forming the first and second portions 18A and 18B of the gap part 17 and the step of forming the initial main pole 15P.

The specific functions and effects of the magnetic head according to the embodiment will now be described. In the embodiment, the write shield 16 includes the first side shield 16A, the second side shield 16B, the bottom shield 16C and the top shield 16D. The embodiment makes it possible that, in regions on opposite sides of the end face 15*a* of the main pole 15 in the track width direction TW and regions on the front and rear sides in the direction T of travel of the recording medium 90 relative to the end face 15*a* of the main pole 15, a magnetic flux that is produced from the end face 15*a* of the main pole 15 and spreads in directions other than the direction perpendicular to the plane of the recording medium 90 can be captured and thereby prevented from reaching the recording medium 90. The embodiment thereby allows for preventing the occurrence of unwanted erasure.

Further, in the embodiment, the end face 15*a* of the main pole 15 located in the medium facing surface 80 has the second and third sides A2 and A3 which are opposite to each other in the track width direction TW, and the distance between the second side A2 and the third side A3 in the track width direction TW decreases with increasing proximity to the top surface 1a of the substrate 1. The embodiment thereby makes it possible to prevent the occurrence of unwanted erasure induced by a skew.

Further, in the embodiment, the main pole 15 has the first to sixth side surfaces S1 to S6 defined as above, and the write shield 16 includes the first and second side shields 16A and 16B. Now, a magnetic head that has a main pole and first and second side shields formed by the following manufacturing method will be contemplated as a comparative example against the embodiment. The manufacturing method for the magnetic head of the comparative example is the same as the manufacturing method for the magnetic head according to the embodiment up to the step shown in FIG. 18. Subsequent to the step of FIG. 18, the manufacturing method for the magnetic head of the comparative example proceeds to the step shown in FIG. 21, that is, the step of forming the first gap layer 18, omitting the step shown in FIG. 19 (the step of forming the mask 84) and the step shown in FIG. 20 (the step of etching the initial side shields 16AP and 16BP). Steps to be performed thereafter are the same as those in the manufacturing method for the magnetic head according to the embodiment.

Figure 24:
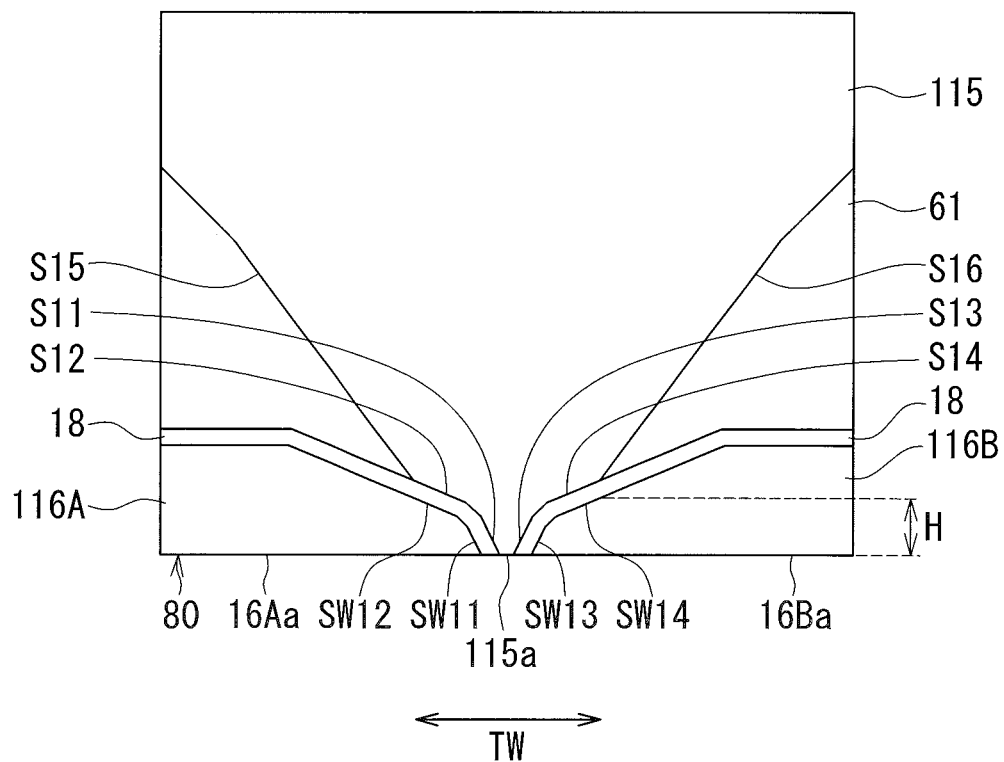
FIG. 24 is a plan view showing part of a main pole and first and second side shields in the vicinity of a medium facing surface in a magnetic head of a comparative example.

FIG. 24 is a plan view showing part of the main pole and the first and second side shields in the vicinity of the medium facing surface in the magnetic head of the comparative example. The magnetic head of the comparative example has the main pole 115, the first side shield 116A and the second side shield 116B that are shaped as shown in FIG. 24. The first side shield 116A has a first end face 16Aa located in the medium facing surface 80, and has a first sidewall SW11 and a second sidewall SW12 facing the main pole 115. The second side shield 116B has a second end face 16Ba located in the medium facing surface 80, and has a third sidewall SW13 and a fourth sidewall SW14 facing the main pole 115. The first sidewall SW11 is connected to the first end face 16Aa. The second sidewall SW12 is connected to the first sidewall SW11, and is located farther from the medium facing surface 80 than is the first sidewall SW11. The third sidewall SW13 is connected to the second end face 16Ba. The fourth sidewall SW14 is connected to the third sidewall SW13, and is located farther from the medium facing surface 80 than is the third sidewall SW13.

The main pole 115 includes: a track width defining portion having an end face located in the medium facing surface 80 and an end opposite to the end face; and a wide portion connected to the end of the track width defining portion. In the track width defining portion, the width of the top surface of the main pole 115 in the track width direction TW gradually increases with increasing distance from the medium facing surface 80. The width of the top surface of the main pole 115 in the track width direction TW is greater in the wide portion than in the track width defining portion.

Further, the main pole 115 has an end face 115a located in the medium facing surface 80, and first to sixth side surfaces S11, S12, S13, S14, S15 and S16. The first side surface S11 is connected to the end face 115a and opposed to the first sidewall SW11 of the first side shield 116A. The second side surface S12 is connected to the first side surface S11 and opposed to the second sidewall SW12 of the first side shield 116A. The third side surface S13 is connected to the end face 115a and opposed to the third sidewall SW13 of the second side shield 116B. The fourth side surface S14 is connected to the third side surface S13 and opposed to the fourth sidewall SW14 of the second side shield 116B. The fifth side surface S15 is connected to the second side surface S12 and located farther from the medium facing surface 80 than is the second side surface S12. The sixth side surface S16 is connected to the fourth side surface S14 and located farther from the medium facing surface 80 than is the fourth side surface S14.

The distance from the medium facing surface 80 to the boundary between the track width defining portion and the wide portion on the top surface of the main pole 115 is equal to the distance from the medium facing surface 80 to the boundary between the second side surface S12 and the fifth side surface S15, and equal to the distance from the medium facing surface 80 to the boundary between the fourth side surface S14 and the sixth side surface S16. Here, the distance from the medium facing surface 80 to the boundary between the track width defining portion and the wide portion on the top surface of the main pole 115, that is, the length of the track width defining portion in the direction perpendicular to the medium facing surface 80, will be defined as the neck height of the comparative example.

In the comparative example, the first and second side shields 116A and 116B are formed in the openings 83a and 83b of the second resist layer 83, respectively, like the initial side shields 16AP and 16BP of the embodiment. The openings 83a and 83b are defined in shape by photolithography. Accordingly, in the comparative example, the top surfaces of the side shields 116A and 116B are defined in shape by photolithography. In this case, as shown in FIG. 24, portions of edges of the top surfaces of the side shields 116A and 116B in the vicinity of the main pole 115 are each formed into the shape of an arc having a large radius of curvature.

Here, an edge of the top surface of each of the side shields 116A and 116B that faces the main pole 115 will be referred to as the pole-facing edge, and the distance from the medium facing surface 80 to a point on the pole-facing edge at which the distance between the main pole 115 and the pole-facing edge starts to increase will be denoted by symbol H, as shown in FIG. 24. The distance H corresponds to the side shield height SH of the embodiment. In the comparative example, an attempt to reduce the distance H would lead to an increase in the distance between the side shields 116A and 116B in the medium facing surface 80, thus precluding a reduction of the track width of the main pole 115 to a desired small value. On the other hand, an attempt to reduce the track width of the main pole 115 to a desired small value would lead to an increase in the distance H. Accordingly, in the comparative example, it is not possible to reduce the neck height of the main pole 115 while reducing the track width of the main pole 115 to a desired small value. Further, in the comparative example, the second and fourth sidewalls SW12 and SW14 form the same angles as the first and third sidewalls SW11 and SW13, respectively, with respect to the direction perpendicular to the top surface 1a of the substrate 1. As a result, the second side surface S12 is inclined in the same form as the first side surface S11, and the fourth side surface S14 is inclined in the same form as the third side surface S13. Consequently, in the comparative example, the main pole 115 cannot have a sufficiently large cross-sectional area in the vicinity of the medium facing surface 80.

In the embodiment, in contrast, it is possible to reduce the side shield height SH shown in FIG. 4 while reducing the track width of the main pole 15 to a desired small value. More specifically, in the embodiment, the side shield height SH is equal to the distance from the medium facing surface 80 to each of the edges E1 and E2 of the second and fourth sidewalls SW2 and SW4 that are farthest from the top surface 1a of the substrate 1. The position of the edges E1 and E2 is defined by the position of the portion 84a1 of the wall face 84a of the mask 84 shown in FIG. 19. The position of the portion 84a1 can be selected as desired, independently of the track width of the main pole 15, and can be brought close to the position ABS at which the medium facing surface 80 is to be formed.

Here, the distance from the medium facing surface 80 to the boundary between the track width defining portion 15A and the wide portion 15B on the top surface 15T of the main pole 15, that is, the length of the track width defining portion 15A in the direction perpendicular to the medium facing surface 80, will be defined as the neck height of the embodiment. In the embodiment, it is possible to reduce the neck height by reducing the side shield height SH.

Further, in the embodiment, the second sidewall SW2 forms a smaller angle with respect to the direction perpendicular to the top surface 1a of the substrate 1 than does the first sidewall SW1, and the fourth sidewall SW4 forms a smaller angle with respect to the direction perpendicular to the top surface 1a of the substrate 1 than does the third sidewall SW3. As a result, in the main pole 15 of the embodiment, the second side surface S2 forms a smaller angle with respect to the direction perpendicular to the top surface 1a of the substrate 1 than does the first side surface S1, and the fourth side surface S4 forms a smaller angle with respect to the direction perpendicular to the top surface 1a of the substrate 1 than does the third side surface S3.

When compared with the comparative example, the main pole 15 of the embodiment is larger in cross-sectional area perpendicular to the direction of flow of magnetic flux in the portions near the boundary between the first side surface S1 and the second side surface S2 and the boundary between the third side surface S3 and the fourth side surface S4. Accordingly, when compared with the comparative example, the main pole 15 of the embodiment allows more magnetic flux to pass through the portion near the boundary between the first side surface S1 and the second side surface S2, that is, near the first connecting surface SA, and the portion near the boundary between the third side surface S3 and the fourth side surface S4, that is, near the second connecting surface SB. Consequently, the embodiment provides improved write characteristics, such as improved overwrite property, relative to the comparative example.

In the comparative example, the cross-sectional area of the wide portion of the main pole 115 at the boundary between the track width defining portion and the wide portion is limited by the distance between the sidewalls SW12 and SW14. In the embodiment, in contrast, since the edges E1 and E2 of the second and fourth sidewalls SW2 and SW4 are parallel to the medium facing surface 80, the cross-sectional area of the wide portion 15B of the main pole 15 at the boundary between the track width defining portion 15A and the wide portion 15B can be increased without being limited by the second and fourth sidewalls SW2 and SW4. The embodiment thus allows the main pole 15 to have a larger cross-sectional area in the vicinity of the medium facing surface 80 when compared with the comparative example.

By virtue of the foregoing features, the embodiment makes it possible to sufficiently increase the cross-sectional area of the main pole 15 in the vicinity of the medium facing surface 80, and consequently allows for further improvement in write characteristics.

Consequently, the embodiment is able to achieve prevention of unwanted erasure and improvement in write characteristics at the same time.

The present invention is not limited to the foregoing embodiment, and various modifications may be made thereto. For example, as far as the requirements of the appended claims are met, the shapes of the main pole 15, the first side shield 16A and the second side shield 16B are not limited to the examples illustrated in the foregoing embodiment, and can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferred embodiment.

What is claimed is:

1. A magnetic head for perpendicular magnetic recording, comprising:

a medium facing surface configured to face a recording medium;

a coil configured to produce a magnetic field corresponding to data to be written on the recording medium;

a main pole configured to allow a magnetic flux corresponding to the magnetic field produced by the coil to pass, and configured to produce a write magnetic field for writing the data on the recording medium by means of a perpendicular magnetic recording system;

a write shield formed of a magnetic material;

a gap part formed of a nonmagnetic material and provided between the main pole and the write shield; and a substrate having a top surface, wherein the coil, the main pole, the write shield and the gap part are disposed above the top surface of the substrate, the write shield includes a first side shield and a second side shield located on opposite sides of the main pole in a track width direction, the first side shield has a first end face located in the medium facing surface, and has a first sidewall and a second sidewall facing the main pole, the second side shield has a second end face located in the medium facing surface, and has a third sidewall and a fourth sidewall facing the main pole, the first sidewall is connected to the first end face, the second sidewall is located farther from the medium facing surface than is the first sidewall, the third sidewall is connected to the second end face, the fourth sidewall is located farther from the medium facing surface than is the third sidewall, in any cross section intersecting the first and third sidewalls and parallel to the medium facing surface, a distance between the first sidewall and the third sidewall in the track width direction decreases with increasing proximity to the top surface of the substrate, the second sidewall forms a smaller angle with respect to a direction perpendicular to the top surface of the substrate than does the first sidewall, the fourth sidewall forms a smaller angle with respect to the direction perpendicular to the top surface of the substrate than does the third sidewall, each of the second and fourth sidewalls has an edge farthest from the top surface of the substrate, the edge of each of the second and fourth sidewalls is parallel to the medium facing surface and located at a distance of 20 to 120 nm from the medium facing surface, the main pole has an end face located in the medium facing surface, a top surface farthest from the top surface of the substrate, a bottom end opposite to the top surface, and a first, a second, a third and a fourth side surface, the end face of the main pole has a first side located at an end of the top surface of the main pole, and has a second side and a third side opposite to each other in the track width direction, a distance between the second side and the third side in the track width direction decreases with increasing proximity to the top surface of the substrate, the first side surface is connected to the second side, the second side surface is located farther from the medium facing surface than is the first side surface, the third side surface is connected to the third side, the fourth side surface is located farther from the medium facing surface than is the third side surface, the first side surface is opposed to the first sidewall, a portion of the second side surface is opposed to the second sidewall, the third side surface is opposed to the third sidewall, a portion of the fourth side surface is opposed to the fourth sidewall, in any cross section intersecting the first and third side surfaces and parallel to the medium facing surface, a distance between the first side surface and the third side surface in the track width direction decreases with increasing proximity to the top surface of the substrate, the second side surface forms a smaller angle with respect to the direction perpendicular to the top surface of the substrate than does the first side surface, the fourth side surface forms a smaller angle with respect to the direction perpendicular to the top surface of the substrate than does the third side surface, and the gap part includes a first portion interposed between the first sidewall and the first side surface and between the second sidewall and the second side surface, and a second portion interposed between the third sidewall and the third side surface and between the fourth sidewall and the fourth side surface.

2. The magnetic head for perpendicular magnetic recording according to claim 1, wherein the main pole further has a first connecting surface connecting the first side surface and the second side surface, and a second connecting surface connecting the third side surface and the fourth side surface, and each of the first and second connecting surfaces has a width that increases with increasing proximity to the top surface of the substrate.

3. The magnetic head for perpendicular magnetic recording according to claim 1, wherein the main pole further has a fifth side surface connected to the second side surface, and a sixth side surface connected to the fourth side surface, the fifth side surface is located farther from the medium facing surface than is the second side surface, the sixth side surface is located farther from the medium facing surface than is the fourth side surface, the fifth side surface forms a smaller angle with respect to the direction perpendicular to the top surface of the substrate than does the first side surface, and the sixth side surface forms a smaller angle with respect to the direction perpendicular to the top surface of the substrate than does the third side surface.

4. The magnetic head for perpendicular magnetic recording according to claim 1, wherein the write shield further includes a bottom shield and a top shield, the bottom shield has an end face that is located in the medium facing surface at a position on a rear side in a direction of travel of the recording medium relative to the end face of the main pole, and the top shield has an end face that is located in the medium facing surface at a position on a front side in the direction of travel of the recording medium relative to the end face of the main pole.

5. A manufacturing method for the magnetic head for perpendicular magnetic recording of claim 1, comprising:

a step of forming a first initial side shield having the first sidewall, and a second initial side shield having the third sidewall;

an etching step of etching a portion of the first initial side shield and a portion of the second initial side shield so that the first initial side shield is provided with the second sidewall and the second initial side shield is provided with the fourth sidewall;

a step of forming the first and second portions of the gap part after the etching step;

a step of forming an initial main pole after the step of forming the first and second portions of the gap part;

a step of forming the coil; and a step of forming the medium facing surface so that the first initial side shield becomes the first side shield, the second initial side shield becomes the second side shield, and the initial main pole becomes the main pole.

6. The manufacturing method according to claim 5, wherein the main pole further has a first connecting surface connecting the first side surface and the second side surface, and a second connecting surface connecting the third side surface and the fourth side surface, and each of the first and second connecting surfaces has a width that increases with increasing proximity to the top surface of the substrate.

7. The manufacturing method according to claim 5, wherein the main pole further has a fifth side surface connected to the second side surface, and a sixth side surface connected to the fourth side surface, the fifth side surface is located farther from the medium facing surface than is the second side surface, the sixth side surface is located farther from the medium facing surface than is the fourth side surface, the fifth side surface forms a smaller angle with respect to the direction perpendicular to the top surface of the substrate than does the first side surface, the sixth side surface forms a smaller angle with respect to the direction perpendicular to the top surface of the substrate than does the third side surface, and the manufacturing method further comprises a step of forming a mold having a first inner wall and a second inner wall that define shapes of the fifth side surface and the sixth side surface of the main pole, respectively, the step of forming the mold being performed between the step of forming the first and second portions of the gap part and the step of forming the initial main pole.

8. The manufacturing method according to claim 5, wherein the write shield further includes a bottom shield and a top shield, the bottom shield has an end face that is located in the medium facing surface at a position on a rear side in a direction of travel of the recording medium relative to the end face of the main pole, and the top shield has an end face that is located in the medium facing surface at a position on a front side in the direction of travel of the recording medium relative to the end face of the main pole.

* * * * *